(12) United States Patent
Amiruddin et al.

(10) Patent No.: US 9,923,195 B2
(45) Date of Patent: Mar. 20, 2018

(54) LITHIUM ION BATTERIES WITH SUPPLEMENTAL LITHIUM

(75) Inventors: Shabab Amiruddin, Fremont, CA (US); Subramanian Venkatachalam, Pleasanton, CA (US); Bing Li, Union City, CA (US); Herman A. Lopez, Sunnyvale, CA (US); Sujeet Kumar, Newark, CA (US)

(73) Assignee: Zenlabs Energy, Inc., Fremont, CA (US)

(*) Notice: Subject to any disclaimer, the term of this patent is extended or adjusted under 35 U.S.C. 154(b) by 0 days.

(21) Appl. No.: 13/305,981

(22) Filed: Nov. 29, 2011

(65) Prior Publication Data

US 2012/0105007 A1   May 3, 2012

Related U.S. Application Data

(62) Division of application No. 12/938,073, filed on Nov. 2, 2010, now Pat. No. 9,166,222.

(51) Int. Cl.
*H01M 4/139* (2010.01)
*H01M 4/1393* (2010.01)
(Continued)

(52) U.S. Cl.
CPC ...... *H01M 4/1393* (2013.01); *C01G 45/1228* (2013.01); *C01G 45/1257* (2013.01); *C01G 51/50* (2013.01); *C01G 53/50* (2013.01); *H01M 4/0447* (2013.01); *H01M 4/1395* (2013.01); *H01M 4/386* (2013.01); *H01M 4/505* (2013.01);
(Continued)

(58) Field of Classification Search
USPC ........................................... 429/206
See application file for complete search history.

(56) References Cited

U.S. PATENT DOCUMENTS

| 4,945,014 A | 7/1990 | Miyabayashi et al. |
| 5,147,739 A | 9/1992 | Beard |

(Continued)

FOREIGN PATENT DOCUMENTS

| EP | 752727 A1 | 1/1997 |
| EP | 1170816 A2 | 1/2002 |

(Continued)

OTHER PUBLICATIONS

Stefan U.S. Appl. No. 61/386,868.*

(Continued)

*Primary Examiner* — Lucas J. O'Donnell
(74) *Attorney, Agent, or Firm* — Christensen, Fonder, Dardi & Herbert PLLC; Peter S. Dardi

(57) ABSTRACT

Supplemental lithium can be used to stabilize lithium ion batteries with lithium rich metal oxides as the positive electrode active material. Dramatic improvements in the specific capacity at long cycling have been obtained. The supplemental lithium can be provided with the negative electrode, or alternatively as a sacrificial material that is subsequently driven into the negative electrode active material. The supplemental lithium can be provided to the negative electrode active material prior to assembly of the battery using electrochemical deposition. The positive electrode active materials can comprise a layered-layered structure comprising manganese as well as nickel and/or cobalt.

12 Claims, 11 Drawing Sheets

(51) Int. Cl.
*H01M 4/38* (2006.01)
*H01M 4/587* (2010.01)
*H01M 4/505* (2010.01)
*H01M 10/44* (2006.01)
*H01M 4/04* (2006.01)
*H01M 4/1395* (2010.01)
*H01M 10/052* (2010.01)
*H01M 10/058* (2010.01)
*C01G 45/12* (2006.01)
*C01G 51/00* (2006.01)
*C01G 53/00* (2006.01)
*H01M 6/50* (2006.01)

(52) U.S. Cl.
CPC ......... *H01M 4/587* (2013.01); *H01M 10/052* (2013.01); *H01M 10/058* (2013.01); *H01M 10/446* (2013.01); *C01P 2004/82* (2013.01); *H01M 6/5005* (2013.01); *Y02E 60/122* (2013.01); *Y02T 10/7011* (2013.01); *Y10T 29/49108* (2015.01); *Y10T 29/49115* (2015.01)

(56) References Cited

U.S. PATENT DOCUMENTS

| | | |
|---|---|---|
| 5,162,176 A * | 11/1992 | Herr et al. .......... 429/223 |
| 5,436,093 A | 7/1995 | Huang et al. |
| 5,443,601 A | 8/1995 | Doeff et al. |
| 5,514,488 A | 5/1996 | Hake et al. |
| 5,541,022 A | 7/1996 | Mizumoto et al. |
| 5,595,837 A | 1/1997 | Olsen et al. |
| 5,601,947 A | 2/1997 | Skotheim et al. |
| 5,601,951 A | 2/1997 | Johnson et al. |
| 5,721,067 A * | 2/1998 | Jacobs et al. .......... 429/60 |
| 5,743,921 A | 4/1998 | Nazri et al. |
| 5,753,388 A | 5/1998 | Koksbang et al. |
| 5,948,569 A | 9/1999 | Moses et al. |
| 6,025,093 A | 2/2000 | Herr |
| 6,080,507 A | 6/2000 | Yu |
| 6,171,723 B1 | 1/2001 | Loch et al. |
| 6,235,427 B1 | 5/2001 | Idota et al. |
| 6,251,822 B1 | 6/2001 | Peng et al. |
| 6,335,115 B1 | 1/2002 | Meissner |
| 6,337,156 B1 | 1/2002 | Narang et al. |
| 6,383,687 B1 | 5/2002 | Gibbons et al. |
| 6,420,071 B1 | 7/2002 | Lee et al. |
| 6,511,767 B1 | 1/2003 | Calver et al. |
| 6,528,208 B1 | 3/2003 | Thackeray et al. |
| 6,616,715 B2 | 9/2003 | Kitoh et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,706,447 B2 | 3/2004 | Gao et al. |
| 6,730,429 B2 | 5/2004 | Thackeray et al. |
| 6,737,191 B2 * | 5/2004 | Gan et al. .......... 429/128 |
| 6,749,648 B1 | 6/2004 | Kumar et al. |
| 6,783,896 B2 | 8/2004 | Tsujioka et al. |
| 6,787,267 B2 | 9/2004 | Tsujioka et al. |
| 6,787,268 B2 | 9/2004 | Koike et al. |
| 6,855,460 B2 | 2/2005 | Vaughey et al. |
| 6,884,546 B1 | 4/2005 | Fujita et al. |
| 6,936,382 B2 | 8/2005 | Mikhalyik et al. |
| 6,951,699 B2 | 10/2005 | Yata et al. |
| 6,964,828 B2 | 11/2005 | Lu et al. |
| 7,026,074 B2 | 4/2006 | Chen et al. |
| 7,033,702 B2 | 4/2006 | Dasgupta et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,186,479 B2 | 3/2007 | Krasnov et al. |
| 7,198,869 B2 | 4/2007 | Ghantous et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,214,446 B1 | 5/2007 | Bi et al. |
| 7,229,717 B2 | 6/2007 | Yamaguchi et al. |
| 7,235,330 B1 | 6/2007 | Fujimoto et al. |
| 7,252,907 B2 | 8/2007 | Takeuchi et al. |
| 7,273,682 B2 | 9/2007 | Park et al. |
| 7,276,314 B2 | 10/2007 | Gao et al. |
| 7,338,734 B2 | 3/2008 | Chiang et al. |
| 7,351,494 B2 | 4/2008 | Hennige et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,497,285 B1 | 3/2009 | Radev |
| 7,507,503 B2 | 3/2009 | Amine et al. |
| 7,510,803 B2 | 3/2009 | Adachi et al. |
| 7,544,443 B2 | 6/2009 | Fujihara et al. |
| 7,563,541 B2 | 7/2009 | Howard et al. |
| 7,575,830 B2 | 8/2009 | Kawamura et al. |
| 7,582,387 B2 | 9/2009 | Howard et al. |
| 7,588,623 B2 | 9/2009 | Dover et al. |
| 7,718,306 B2 | 5/2010 | Cheon et al. |
| 7,923,150 B2 | 4/2011 | Yamamoto et al. |
| 7,927,506 B2 | 4/2011 | Park et al. |
| 7,935,270 B2 | 5/2011 | Park et al. |
| 2002/0102462 A1 * | 8/2002 | Huggins et al. .......... 429/231.9 |
| 2002/0122973 A1 | 9/2002 | Manev et al. |
| 2003/0087155 A1 | 5/2003 | Cho et al. |
| 2003/0135989 A1 * | 7/2003 | Huggins et al. .......... 29/623.1 |
| 2003/0157014 A1 | 8/2003 | Wang et al. |
| 2004/0023117 A1 | 2/2004 | Imachi et al. |
| 2004/0048152 A1 | 3/2004 | Yata et al. |
| 2004/0072072 A1 | 4/2004 | Suzuki et al. |
| 2004/0091779 A1 * | 5/2004 | Kang et al. .......... 429/231.1 |
| 2004/0151951 A1 | 8/2004 | Hyung et al. |
| 2004/0161669 A1 | 8/2004 | Zolotnik et al. |
| 2004/0191630 A1 | 9/2004 | Kawamura et al. |
| 2005/0019670 A1 | 1/2005 | Amine et al. |
| 2005/0026037 A1 | 2/2005 | Riley, Jr. et al. |
| 2005/0026040 A1 | 2/2005 | Thackeray et al. |
| 2005/0031942 A1 | 2/2005 | Hennige et al. |
| 2005/0130043 A1 | 6/2005 | Gao et al. |
| 2005/0202316 A1 | 9/2005 | Hwang et al. |
| 2006/0051671 A1 | 3/2006 | Thackeray et al. |
| 2006/0051673 A1 | 3/2006 | Johnson et al. |
| 2006/0051677 A1 * | 3/2006 | Matsushima et al. .......... 429/235 |
| 2006/0078797 A1 | 4/2006 | Munshi et al. |
| 2006/0099472 A1 | 5/2006 | Hsu |
| 2006/0147809 A1 | 7/2006 | Amine et al. |
| 2006/0197496 A1 | 9/2006 | Iijima et al. |
| 2006/0269834 A1 | 11/2006 | West et al. |
| 2006/0286438 A1 | 12/2006 | Fujikawa et al. |
| 2007/0148544 A1 | 6/2007 | Le |
| 2008/0008933 A1 | 1/2008 | Lampe-Onnerud |
| 2008/0026297 A1 | 1/2008 | Chen et al. |
| 2008/0213671 A1 | 9/2008 | Kogetsu et al. |
| 2008/0261115 A1 | 10/2008 | Saito et al. |
| 2008/0268347 A1 | 10/2008 | Ohzuku et al. |
| 2008/0274408 A1 | 11/2008 | Jarvis et al. |
| 2008/0318122 A1 | 12/2008 | Sun |
| 2009/0023065 A1 | 1/2009 | Hwang et al. |
| 2009/0092900 A1 | 4/2009 | Obana et al. |
| 2009/0214952 A1 | 8/2009 | Wakita et al. |
| 2009/0253042 A1 | 10/2009 | Sun et al. |
| 2009/0263707 A1 | 10/2009 | Buckley et al. |
| 2009/0263721 A1 | 10/2009 | Haruna et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0120179 A1 * | 5/2010 | Zhamu et al. .......... 438/19 |
| 2010/0151332 A1 | 6/2010 | Lopez et al. |
| 2010/0159366 A1 * | 6/2010 | Shao-Horn et al. .......... 429/532 |
| 2010/0173198 A1 * | 7/2010 | Zhamu et al. .......... 429/222 |
| 2010/0233543 A1 | 9/2010 | Numata et al. |
| 2010/0330430 A1 | 12/2010 | Chung et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |

(56) References Cited

U.S. PATENT DOCUMENTS

| | | | |
|---|---|---|---|
| 2011/0111298 A1 | 5/2011 | Lopez et al. | |
| 2011/0111304 A1* | 5/2011 | Cui et al. | 429/231.8 |
| 2011/0136019 A1 | 6/2011 | Amiruddin et al. | |
| 2011/0236751 A1 | 9/2011 | Amiruddin et al. | |
| 2011/0244331 A1 | 10/2011 | Karthikeyan et al. | |
| 2011/0262810 A1* | 10/2011 | Lemmon et al. | 429/216 |
| 2012/0045670 A1* | 2/2012 | Stefan et al. | 429/61 |
| 2012/0070741 A1 | 3/2012 | Liu et al. | |
| 2012/0107680 A1 | 5/2012 | Amiruddin et al. | |
| 2012/0264020 A1 | 10/2012 | Burton et al. | |

FOREIGN PATENT DOCUMENTS

| | | |
|---|---|---|
| JP | 07-065825 | 3/1995 |
| JP | 09-045373 | 2/1997 |
| JP | 10-255837 | 9/1998 |
| JP | 2000-012018 | 1/2000 |
| JP | 2002-110167 | 4/2002 |
| JP | 2003-223887 | 8/2003 |
| JP | 2003-242978 A | 8/2003 |
| JP | 2004-303597 A | 10/2004 |
| JP | 2005-251684 A | 9/2005 |
| JP | 2007-066667 A | 3/2007 |
| JP | 2007-220630 A | 8/2007 |
| JP | 2008-098151 A | 4/2008 |
| JP | 2009/252705 A | 10/2009 |
| KR | 10-2001-0043360 A | 5/2001 |
| KR | 10-2003-0007651 A | 1/2003 |
| KR | 10-2005-0111764 A | 11/2005 |
| KR | 10-0578877 B1 | 5/2006 |
| KR | 10-0684724 B1 | 2/2007 |
| WO | 99/60638 A2 | 11/1999 |
| WO | 01/35473 A1 | 5/2001 |
| WO | 01/91209 A1 | 11/2001 |
| WO | 03/021697 A2 | 3/2003 |
| WO | 2004/084330 A2 | 9/2004 |
| WO | 2005/031898 A1 | 4/2005 |
| WO | 2005/083829 A2 | 9/2005 |
| WO | 2006/109930 A1 | 10/2006 |
| WO | 2006/137673 A1 | 12/2006 |
| WO | 2007/126257 A1 | 11/2007 |
| WO | 2008/086041 A1 | 7/2008 |
| WO | 2009/022848 A1 | 2/2009 |
| WO | 2011-056847 | 5/2011 |

OTHER PUBLICATIONS

Boulineau et al., "Reinvestigation of Li2MnO3 Structure: Electron Diffraction and High Resolution TEM," Chem. Mater. 2009, 21, 4216-4222.

Chiang et al., "High Capacity, Temperature-Stable Lithium Aluminum Manganese Oxide Cathodes for Rechargeable Batteries," Electrochemical and Solid-State Letters, 2(3) 107-110 (1999).

Hong et al., "Structural evolution of layered Li1.2Ni0.2Mn0.6O2 upon electrochemical cycling in a Li rechargeable battery," J. Mater. Chem., 2010, 20, 10179-10186.

Ito et al., Cyclic deterioration and its improvement for Li-rich layered cathode material Li [Ni0.17Li0.2Co0.07Mn0.56]O2, Journal of Power Sources, 2010; 195:567-573 (Abstract only).

Ito et al., "A new approach to improve the high-voltage cyclic performance of Li-rich layered cathode material by electrochemical pre-treatment," Journal of Power Sources, 2008; 183:344-346 (Abstract only).

Johnson et al., "Lithium-manganese oxide electrodes with layered-spinel composite structures xLi2MnO3 • (1-x)Li1+yMn2-yO4 (0<x<1, 0≤y≤0.33) for lithium batteries," Electrochemistry Communications 7 (2005) 528-536.

Kang et al., "Enchancing the rate capability of high capacity xLi2MnO3 • (1-x)LiMO2 (M=Mn, Ni, Co) electrodes by Li—Ni—PO4 treatment," Electrochemistry Communications 11 (2009) 748-751.

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152 (9) A1701-A1713 (2005).

Lee et al., "High capacity Li[Li0.2Ni0.2Mn0.6]O2 cathode materials via a carbonate co-precipitation method," Journal of Power Sources, 162 (2006), 1346-1350.

Park et al., "Physical and electrochemical properties of spherical Li1+x(Ni1/3Co1/3Mn1/3)1-xO2 cathode materials", Journal of Power Sources, 177:177-183 (2008).

Robertson et al., "Mechanism of Electrochemical Activity in Li2MnO3," Chem. Mater. 2003, 15, 1984-1902.

Song et al., "Two- and three-electrode impedance spectroscopy of lithium-ion batteries," Journal of Power Sources 111 (2002) 255-267.

Sun et al., "AlF3-Coating to Improve High Voltage Cycling Performance of Li[Ni1/3Co1/3Mn1/3]O2 Cathode Materials for Lithium Secondary Batteries," Journal of the Electrochemical Society, 154 (3), A168-A172 (2007).

Sun et al., "Significant Improvement of high voltage cycling behavior AlF3-coated LiCoO2 cathode," Electrochemistry Communications 8 (2006) 821-826.

Sun et al., "The preparation and electrochemical performance of solid solutions LiCoO2—Li2MnO3 as cathode materials for lithium ion batteries," Journal of Power Sources 159 (2006) 1353-1359.

Thackeray et al., "Li2MnO3-stabilized LiMO2 (M=Mn, Ni, Co) electrodes for lithium-ion batteries," J. Mater. Chem., 2007; 17:3112-3125.

Thackeray et al., "Comments on the structural complexity of lithium-rich Li1+xM1-xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid-State Letters, 9 (5) A221-A224 (2006).

Yabuuchi et al., "Detailed Studies of a High-Capacity Electrode Material for Rechargeable Batteries, Li2MnO3—LiCo1/3Ni1/3Mn1/3O2," J. Am. Chem. Soc. 2011, 133, 4404-4419.

Yakovleva et al. "Stabilized Lithium Metal Powder, Enabling Material and Revolutionary Technology for High Energy Li-ion Batteries"—2010 DOE Vehicle Technologies Program Review, (Presentation, 34 pages).

"Scientific breakthrough: SEPARION® opens up new markets for lithium ion batteries," http://corporate.evonik.de/en/company/news/lithium_ion_batteries/Pages/separion.aspx , Oct. 7, 2009 (1 page).

"For More Charge Use Li, For Maximum Charge, Use FMC's SLMP™ Technology," Product Brochure, FMC Corporation 2008 (1 page).

"Battery Test Manual for Plug-In Hybrid Elelctric Vehicles," prepared for the U.S. Department of Energy, Office of Energy Efficiency and Renewable Energy, Vehicle Technologies Program, 2008 (67 pages).

Search Report and Written Opinion for International Application No. PCT/US2011058012, dated May 24, 2012.

Office Action from co-pending Taiwan application No. 100140011 dated Oct. 3, 2013 (28 pages with translation).

European Search Report from co-pending European application No. 11 83 8563.2 dated Nov. 17, 2014 (15 pages).

Cui et al. U.S. Appl. No. 61/260,294, filed Nov. 11, 2009.

* cited by examiner

LITHIUM ION BATTERIES WITH SUPPLEMENTAL LITHIUM

CROSS REFERENCE TO RELATED APPLICATIONS

This application is a divisional of U.S. patent application Ser. No. 12/938,073, filed on Nov. 2, 2010, now U.S. Pat. No. 9,166,222, to Amiruddin et al., entitled "Lithium Ion Batteries with Supplemental Lithium," incorporated herein by reference.

FIELD OF THE INVENTION

The invention relates to lithium-based batteries having a positive electrode active material, such as a lithium rich composition, and a negative electrode active material that can intercalate/alloy with lithium during charging, in which the battery is formed with additional labile or extractable lithium in addition to the removable lithium provided by the positive electrode active material. The invention further relates to high voltage lithium secondary batteries with surprisingly excellent cycling at very high specific capacities.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium or alloys with lithium. For some current commercial batteries, the negative electrode material can be graphite, and the positive electrode material can comprise lithium cobalt oxide ($LiCoO_2$). In practice, only a modest portion of the theoretical capacity of the cathode can be used. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power batteries, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a lithium ion battery comprising supplemental lithium, a positive electrode, a negative electrode, a separator between the positive electrode and the negative electrode and an electrolyte comprising lithium ions. In some embodiments, the negative electrode comprising a lithium intercalation/alloying composition, and the positive electrode comprises a composition approximately represented by a formula $Li_{1+x}M_{1-y}O_{2-z}F_z$ where M is one or more metal elements, x is from about 0.01 to about 0.33, y is from about x−0.2 to about x+0.2 with the proviso that y≥0, and z is from 0 to about 0.2.

In a further aspect, the invention pertains to a lithium ion battery comprising a negative electrode comprising a lithium intercalation composition, a positive electrode comprising $Li_{1+x}M_{1-y}O_{2-z}F_z$ where M is one or more metal elements, x is from about 0.01 to about 0.33, y is from about x−0.2 to about x+0.2 with the proviso that y≥0, and z is from 0 to about 0.2, and a separator between the negative electrode and the positive electrode. After 600 cycles between 4.5V and 2.0V, the negative electrode can comprise no more than about 1 weight percent metals from the positive electrode.

In another aspect, the invention pertains to a lithium ion battery comprising a positive electrode, a negative electrode, a separator between the positive electrode and the negative electrode and an electrolyte comprising lithium ions, the negative electrode comprising a lithium intercalation/alloying composition. The positive electrode can comprise a composition approximately represented by a formula $Li_{1+x}M_{1-y}O_{2-z}F_z$ where M is one or more metal elements, x is from about 0.01 to about 0.33, y is from about x−0.2 to about x+0.2 with the proviso that y≥0, and z is from 0 to about 0.2. In some embodiments, after cycling the battery for 20 cycles from 4.5 volts to 2 volts and after discharging the battery to 98% of the discharge capacity, the negative electrode can be removed and electrochemically de-intercalated/de-alloyed with a capacity of at least about 0.5% of the negative electrode capacity with the corresponding removal of lithium from the negative electrode.

In other aspects, the claimed invention pertains to a lithium ion battery comprising a positive electrode, a negative electrode, a separator between the positive electrode and the negative electrode and an electrolyte comprising lithium ions, the negative electrode comprising a lithium intercalation/alloying composition, in which the positive electrode has a room temperature specific discharge capacity at the 200th cycle that is at least about 92.5% of the 5th cycle specific discharge capacity when discharged from the 5th cycle to the 200th cycle at a C/3 rate from 4.5V to 2V.

Moreover, the invention pertains to a lithium ion battery comprising a positive electrode, a negative electrode, a separator between the positive electrode and the negative electrode and an electrolyte comprising lithium ions, the negative electrode comprising a lithium intercalation/alloying composition, in which the battery has a room temperature specific discharge capacity at the 175th cycle that is at least about 75% of the 5th cycle specific discharge capacity when discharged from the 5th cycle to the 175th cycle at a 1 C rate from 4.5V to 2V.

In addition, the invention pertains to a lithium ion battery comprising a positive electrode, a negative electrode, a separator between the positive electrode and the negative electrode and an electrolyte comprising lithium ions, the negative electrode comprising a lithium intercalation/alloying composition, wherein the battery has a specific discharge capacity at the 45th cycle that is at least about 90% of the 5th cycle specific discharge capacity when discharged from the 5th cycle to the 45th cycle at a C/3 rate from 4.5V to 2V at a temperature of 55° C.

Furthermore, the invention pertains to a method for the formation of a negative electrode for a lithium ion battery wherein the negative electrode comprises an active lithium intercalation/alloying composition and a polymer binder, the method comprising:

electrochemically intercalation/alloying lithium into the active composition;

de-intercalating/de-alloying electrochemically the lithium from the active composition;

partially electrochemically intercalating/alloying the lithium intercalation/alloying composition to a level from about 2 percent to about 75 percent of the capacity of the composition.

In some embodiments, the electrochemical intercalation/alloying step comprises the intercalation/alloying of lithium to a level of at least about 80 percent of theoretical capacity of the composition and the step of de-intercalating/de-alloying of lithium to a state of the active material with lithium in an amount of no more than about 25% of capacity.

Additionally, the invention pertains to a method for forming a lithium ion battery with supplemental lithium stored in the negative electrode wherein the negative electrode comprises a lithium intercalation/alloying composition and a polymer binder, the method comprising the step of closing a circuit to load supplemental lithium from a sacrificial lithium source into the lithium intercalation/alloying composition in the negative electrode.

Also, the invention pertains to a lithium ion battery comprising a negative electrode comprising a lithium intercalation composition, a positive electrode comprising $Li_{1+x}M_{1-y}O_{2-z}F_z$ where M is one or more metal elements, x is from about 0.01 to about 0.33, y is from about x−0.2 to about x+0.2 with the proviso that y≥0, and z is from 0 to about 0.2; and a separator between the negative electrode and the positive electrode, in which from about 300 cycles to about 600 cycles the positive electrode active material has a specific discharge capacity of at least about 90 mAh/g between 3V and 2.5V.

DETAILED DESCRIPTION OF THE INVENTION

Figure 1:
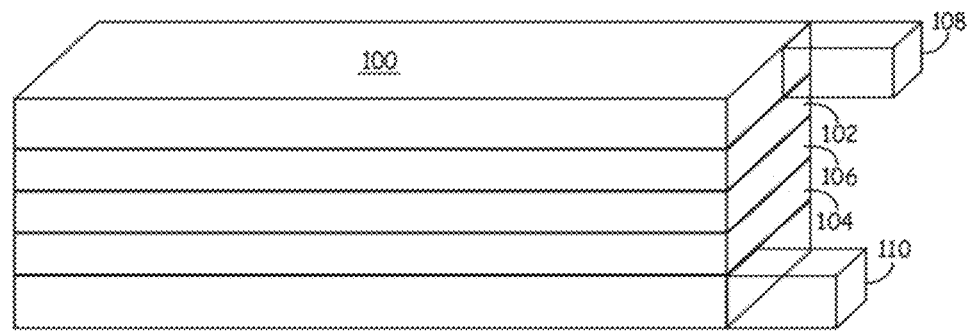
FIG. 1 is a schematic perspective view of a battery stack with a cathode and anode and a separator between the cathode and anode.

It has been discovered that the addition of a supplemental lithium source for a lithium ion battery with a lithium intercalation/alloying composition in the negative electrode results in dramatic decrease in the fading of specific capacity of the positive electrode active material, e.g., a lithium rich metal oxide, upon cycling. This decrease in fading has been identified with stabilization of the positive electrode active material with a corresponding decrease in transition metal dissolution into the electrolyte and incorporation into the negative electrode active material. The positive electrode active material can be a lithium rich positive electrode active material, such as materials represented by the formula x Li$_2$M'O$_3$.(1−x) LiMO$_2$, where M represents one or more metal elements with an average valance of +3 and M' represents one or more metal elements with an average valance of +4. The significantly improved cycling is surprisingly observed with lithium rich positive electrode active materials, which can be expected to supply some excess lithium to the negative electrode in the initial charge that is not cycled due to irreversible changes to the positive electrode active materials. The formation of a more stable solid electrolyte interphase layer has also been observed. Based on the use of the lithium rich positive electrode active materials with the supplemental lithium, the corresponding batteries can cycle with high capacities for a large number of cycles with significantly reduced fading of the battery capacities.

The supplemental lithium can be provided to the negative electrode in various ways. In particular suitable approaches include, for example, introducing elemental lithium into the battery, the incorporation of a sacrificial material with active lithium that can be transferred to the negative electrode active material, or preloading of lithium into the negative electrode active material. A lithium source material can be associated initially with the negative electrode, the positive electrode and/or a sacrificial electrode. If the lithium source material is initially associated with the positive electrode or a sacrificial electrode, the supplemental lithium generally is associated with the negative electrode active material after the first charge step, although a portion of the lithium can be associated with irreversible reaction byproducts, such as the solid electrolyte interphase layer.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into its structure through intercalation, alloying or similar mechanisms. Lithium ion batteries have generally referred to batteries in which the negative electrode active material is also a lithium intercalation/alloying material. Desirable lithium rich mixed metal oxides are described further herein to function as electroactive materials for positive electrodes in secondary lithium ion batteries.

If elemental lithium metal itself is used as the anode or negative electroactive material, the resulting battery generally is referred to as a lithium battery. Lithium batteries can initially cycle with good performance, but dendrites can form upon lithium metal deposition that eventually can breach the separator and result in failure of the battery. As a result, commercial lithium-based secondary batteries have generally avoided the deposition of lithium metal through the use of a negative electrode active material that operates through intercalation/alloying or the like with a slight excess in negative electrode capacity relative to the positive electrode. In other words, appropriately designed lithium ion batteries generally avoid the formation of lithium dendrites.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Unless indicated otherwise, performance values referenced herein are at room temperature.

The word "element" is used herein in its conventional way as referring to a member of the periodic table in which the element has the appropriate oxidation state if the element is in a composition and in which the element is in its elemental form, M$^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell due to changes in the battery materials during the initial cycle.

In lithium ion batteries, the active lithium is generally initially supplied with the positive electrode active material. Specifically, the cathode material generally is initially a lithium metal oxide, such that the battery is first charged to extract the lithium from the positive electrode for transfer to the negative electrode where the lithium is then available for discharging of the battery. During an initial charge of the battery, labile lithium leaves from the positive electrode active material and is taken up reversibly by the negative electrode active material, although some of the lithium may be consumed by irreversible reactions within the battery. The batteries of particular interest comprise an initial supplemental amount of active lithium in addition to the reactive lithium supplied with the positive electrode active material. Surprisingly, the supplemental lithium source provides dramatic improvement to the cycling performance of batteries having a lithium rich positive electrode active material. In particular, this supplemental lithium is surprisingly able to stabilize the positive electrode active material with respect to the degradation of the positive electrode active material. The examples below provide evidence regarding the stabilization of the positive electrode active materials. Data presented in the Examples also indicates that the initially formed solid electrolyte interphase layer is more stable for batteries with supplemental lithium along with the lithium rich positive electrode active material.

Generally, during the first charge of a lithium ion battery, graphitic carbon or other active material reacts at its surface with the electrolyte to form a solid electrolyte interphase (SEI) layer as a coating on the active negative electrode materials, which is believed to comprise some lithium that is consumed from the available lithium accessible for cycling. Other negative electrode active materials that take up lithium through intercalation, alloying or the like generally also react during an initial charge to form an SEI layer. The SEI layer can comprise a by-product of the breakdown of the electrolyte that is believed to incorporate lithium ions into the layer. Thus, the SEI layer generally irreversibly consumes some of the lithium released from the positive electrode during the initial charge of the battery or from a supplemental lithium source. The SEI layer is believed to stabilize the cycling of the battery and to reduce or eliminate the further reaction of the electrolyte at the negative electrode active material.

It has been found that lithium rich positive electrode materials provide very high cycling discharge capacities and good cycling properties under appropriate circumstances. However, for the lithium rich compositions described herein, significant structural and/or compositional changes take place with respect to the positive electrode active material during the first charge, and the changes to the positive electrode active material can contribute significantly to the irreversible capacity loss. In some embodiments, for batteries with lithium rich positive electrode active materials, the irreversible capacity loss associated with the positive electrode active material can be significantly greater than the irreversible capacity loss associated with formation of the solid electrolyte interphase layer.

Based on an initial lithium rich material, the resulting metal oxide following the initial charge generally is incapable of incorporating all of the lithium released back into the material. So the lithium rich metal oxides also can supply excess lithium relative to the amount of lithium cycled. This excess lithium from irreversible changes to the lithium rich metal oxides is confirmed in the data presented in the Examples below. Some of the excess lithium from the irreversible changes to the positive electrode active material may be deposited in the form of lithium oxide, which is inert during cycling, in the SEI layer at the negative electrode and/or in the structure of the negative electrode active material where it is available for cycling but not used for cycling.

Thus, it is particularly surprising and particularly significant that the addition of supplemental lithium in batteries improved performance with a lithium rich positive electrode active material since irreversible changes to the positive electrode active material already supplies additional lithium to the battery relative to the cycling capacity. Any excess lithium resulting from the irreversible changes to the positive electrode active material is in addition to the supplemental lithium described herein. The positive electrode lithium rich compositions can be charged to voltages above 4.3 V such that they exhibit a high specific capacity. In particular, if the performance of both the positive electrode and negative electrode are stable and can achieve a high specific capacity, superior battery performance can be achieved over a large number of cycles.

The first cycle of the battery can be considered a formation cycle due to the irreversible changes that occur. With the addition of supplemental lithium, the negative electrode active material is loaded with significant amounts of excess lithium following discharge of the battery after the first cycle. Depending on the approach to add the supplemental lithium, this lithium can be incorporated into the negative electrode active material spontaneously or the added lithium is incorporated into the negative electrode with the passage of current through an external circuit, either with or without the addition of a voltage, depending on the source of the supplemental lithium.

As the battery is cycled, the supplemental lithium can be identified in the negative electrode following the discharge of the battery. During discharge, lithium is returned to the positive electrode and depleted from the negative electrode. Some lithium can remain in the negative electrode after discharge possibly due to the irreversible capacity loss in the formation cycle. However, when supplemental lithium has been added to the battery, a significantly larger amount of lithium is found in the negative electrode following discharge of the battery. As described in more detail below, the presence of remaining lithium in the negative electrode can be measured by discharging the battery, removing the negative electrode and further removing lithium (de-intercalating/de-alloying) from the negative electrode after removal. The qualitatively different performance of the battery observed if supplemental lithium is added is observed even though there is a small amount of remaining lithium in the negative electrode upon discharge even if the supplemental lithium is not added to the battery. Thus, even though there is some extra lithium from the irreversible capacity loss of the positive electrode active material, there is a dramatic change in the performance if additional supplemental lithium in incorporated into the battery.

The results presented herein demonstrate that the battery can lose capacity with cycling at least in part due to dissolution of transition metals from the positive electrode active materials. For reasons that are not understood, if supplemental active lithium is provided to the negative electrode, this dissolution of transition metals from the positive electrode is decreased to a very large degree. Thus, measurements of the decrease in transition metal dissolution with cycling can be used to evaluate the initial presence of supplemental lithium. Also, in some embodiments, stable discharge capacity between 3V and 2.5V grows in with cycling that continues out to relatively large cycle numbers.

As described herein, positive electrode compositions can include, for example, lithium rich metal oxides, which can operate at relatively high voltages and, in some embodiments, may have a specific layered-layered composite structure. The positive electrode compositions can be coated to stabilize further the composition for cycling at high voltages with a corresponding high specific capacity. With the addition of supplemental lithium, the high specific capacities of the coated positive electrode active materials can be essentially maintained with little or no capacity fade over a large number of charge/discharge cycles under high voltage operation. The materials can also exhibit good performance at higher rates while still maintaining a low capacity fade, e.g. high coulombic efficiency.

The lithium ion batteries can use a positive electrode active material that is lithium rich relative to a reference homogenous electroactive lithium metal oxide composition. In general, the lithium rich compositions of interest can be approximately represented by the formula $Li_{1+b}Mn_\beta M_{1-b-\beta}O_{2-z}F_z$, where M is one or more metal elements, b is from about 0.01 to about 0.33, $\beta$ is from about 0.3 to about 0.65, and z is from 0 to about 0.2. Fluorine is an optional anion dopant. This composition is lithium rich relative to reference composition with the formula $LiMO_2$.

In some embodiments, it is believed that appropriately formed lithium-rich lithium metal oxides have a composite crystal structure. For example, in some embodiments of lithium rich materials, a layered $Li_2M'O_3$ material may be structurally integrated with a layered $LiMO_2$ component, in which a reference structure has M and M' being manganese, although particular compositions of interest have a portion of the manganese cations substituted with other transition metal cations with appropriate oxidation states. M is one or more metal cations with an average valance of +3, and M' is one or more metal cations with an average valance of +4. Generally, for compositions of particular interest, M' can be considered to be Mn. The general class of compositions are described further, for example, in U.S. Pat. No. 6,680,143 (the '143 patent) to Thackeray et al., entitled "Lithium Metal Oxide Electrodes for Lithium Cells and Batteries," incorporated herein by reference.

In some embodiments, the class of lithium rich positive electrode active materials can be approximately represented with a formula:

$$Li_{1+b}Ni_\alpha Mn_\beta Co_\gamma A_\delta O_{2-z}F_z, \qquad (1)$$

where b ranges from about 0.01 to about 0.3, α ranges from 0 to about 0.4, β range from about 0.2 to about 0.65, γ ranges from about 0 to about 0.46, δ ranges from about 0 to about 0.15, and z ranges from 0 to about 0.2 with the proviso that both α and γ are not zero, and where A is a metal element different from Ni, Mn and Co or a combination thereof. Element A and F (fluorine) are optional cation and anion dopants, respectively. Element A can be, for example, Mg, Sr, Ba, Cd, Zn, Al, Ga, B, Zr, Ti, Ca, Ce, Y, Nb, Cr, Fe, V, Li or combinations thereof. The use of a fluorine dopant in lithium rich metal oxides to achieve improved performance is described in copending U.S. patent application Ser. No. 12/569,606, now published application no. 20100086854 to Kumar et al., entitled "Fluorine Doped Lithium Rich Metal Oxide Positive Electrode Battery Materials With High Specific Capacity and Corresponding Batteries," incorporated herein by reference.

The formulas presented herein for the positive electrode active materials are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

The stoichiometric selection for the compositions can be based on some presumed relationships of the oxidation states of the metal ions in the composition. As an initial matter, if in Eq. (1) approximately b+α+β+γ+δ=1, then the formula of the composition can be correspondingly approximately written in two component notation as:

$$x.Li_2MnO_3.(1-x)LiM'O_2, \qquad (2)$$

where M' is one or more metal atoms with an average oxidation state of +3. In some embodiments, M' comprises manganese, nickel, cobalt or a combination thereof along with an optional dopant metal. Then, the two component notation becomes x.Li$_2$MnO$_3$. (1−x)LiNi$_u$Mn$_v$Co$_w$A$_y$O$_2$, where u+v+w+y≈1. While Mn, Co and Ni have multiple accessible oxidation states, which directly relates to their use in the active material, in these composite materials if appropriate amounts of these elements are present, it is thought that the elements can have the oxidation states Mn$^{+4}$, Co$^{+3}$ and Ni$^{+2}$. Then, if δ=0 in Eq. (1), the two component notation can simplify with v≈u to x.Li$_2$MnO$_3$.(1−x)LiNi$_u$Mn$_u$Co$_w$O$_2$, with 2u+w=1. In some embodiments, the stoichiometric selection of the metal elements can be based on these presumed oxidation states. Based on the oxidation state of dopant element A, corresponding modifications of the formula can be made. Also, compositions can be considered in which the composition varies around the stoichiometry with v≈u, and these compositions are described in detail in copending U.S. patent application Ser. No. 12/869,976 (the '976 application), now published application no. 20110052981 to Lopez et al., entitled "Layer-Layer Lithium Rich Complex Metal Oxides With High Specific Capacity and Excellent Cycling," incorporated herein by reference. Similar compositions have been described in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", and published U.S. patent application 2010/0151332A (the '332 application) to Lopez et al. entitled "Positive Electrode Materials for High Discharge Capacity Lithium Ion Batteries", both incorporated herein by reference.

With respect to the charging of a battery with the composite layered-layered materials, the lithium manganese oxide (Li$_2$MnO$_3$) component of the compositions can undergo a reaction to release molecular oxygen with an associated release of 2 Li+ ions as indicated in equation (3):

$$Li_2MnO_3 \rightarrow MnO_2 + 2Li^+ + 2e^- + \tfrac{1}{2}O_2. \qquad (3)$$

Upon discharge, the MnO$_2$ composition takes up a single lithium ion and a single electron to form LiMnO$_2$ so that there is an overall significant decrease in capacity due to the irreversible reaction of the material during the initial charge. Evidence suggests that the reaction in Eq. (3) takes place at voltages above about 4.4 volts. Thus, with the lithium rich layer-layer material, during the first cycle charge above about 4.4V, decomposition of a Li$_2$MnO$_3$ component in the high capacity material can lead to oxygen loss and an irreversible capacity loss. The materials in principle can undergo other irreversible changes that may coincide with the initial charge step, such as a decomposition reaction Li$_2$MnO$_3 \rightarrow$ MnO$_2$+Li$_2$O. Such a decomposition reaction does not result in a measured irreversible capacity loss since no electrons are generated that would be measured during the initial charge, but such a reaction to form inert lithium oxide could result in a loss of reversible capacity relative to the theoretical capacity for a particular weight of material.

Carbonate and hydroxide co-precipitation processes have been performed for the desired lithium rich metal oxide materials described herein. Generally, a solution is formed from which a metal hydroxide or carbonate is precipitated with the desired metal stoichiometry. The metal hydroxide or carbonate compositions from co-precipitation can be subsequently heat-treated to form the corresponding metal oxide composition with appropriate crystallinity. The lithium cations can either be incorporated into the initial co-precipitation process, or the lithium can be introduced in a solid state reaction during or following the heat treatment to form the oxide compositions from the hydroxide or carbonate compositions. The resulting lithium rich metal oxide materials formed with the co-precipitation process can have improved performance properties.

Also, it has been found that coating the positive electrode active materials can improve the cycling of lithium-based batteries. The coating can also be effective at reducing the irreversible capacity loss of the battery as well as increasing the specific capacity generally. The amount of coating material can be selected to accentuate the observed performance improvements. The improvements of coating materials for lithium rich positive electrode active materials are described further in the '332 application and the '853 application. Suitable coating materials, which are generally believed to be electrochemically inert during battery cycling, can comprise metal fluorides, metal oxides, metal non-fluoride halides or metal phosphates. The results in the Examples below are obtained with materials coated with metal fluorides.

For example, the general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in copending U.S. patent application Ser. No. 12/616,226, now published application no. 20110111298 to Lopez et al, (the '226 application) entitled "Coated Positive Electrode Materials for Lithium Ion Batteries," incorporated herein by reference. Suitable metal oxide coatings are described further, for example, in copending U.S. patent application Ser. No. 12/870,096, now published application no. 20110076556 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in copending U.S. patent application Ser. No. 12/888,131 to Venkatachalam et al., entitled "Metal Halide Coatings on Lithium Ion Battery Positive Electrode Materials and Corresponding Batteries," incorporated herein by reference.

The supplemental lithium can be introduced through one or more approaches. In general, a plurality of supplemental lithium sources can be used and various types of supplemental lithium sources are described. For example, the supplemental lithium can be supplied as elemental lithium metal within the initial battery structure, a sacrificial lithium source separate from the positive electrode active material, and/or lithium inserted into the negative electrode active material prior to assembly of the battery with the positive electrode to be cycled. When the source of supplemental lithium is elemental lithium or a sacrificial lithium source, the supplemental lithium is inserted into the negative electrode active material following assembly of the battery. If the source of supplemental lithium is within or directly associated with the negative electrode, the incorporation of the supplemental lithium into the negative electrode active material can be spontaneous. If the source of supplemental lithium is not within or directly associated with the negative electrode, an electrical connection between appropriate electrodes generally is used to transport electrons to maintain electrical neutrality within the battery while supplemental lithium is incorporated into the negative electrode.

With respect to the inclusion of elemental lithium within the battery, the lithium metal or alloy can be associated with the negative electrode, the positive electrode, a distinct sacrificial electrode or a combination thereof. If the elemental lithium and the negative electrode active material are in contact with a common electrolyte solution and with electrical conductivity between the material, reactions can take place in the battery in an open circuit configuration in which the SEI layer forms and/or lithium is incorporated into the lithium intercalation/alloy composition since these are spontaneous reactions. In some embodiments, the elemental lithium can be added as a powder within the negative electrode structure, and in additional or alternative embodiments, the elemental lithium can be placed on the surface of the negative electrode as a foil or power with or without binder.

If the elemental lithium is associated with the positive electrode or a separate sacrificial electrode, the respective electrodes are connected in a circuit to provide for the half reactions to occur that result in the net transfer of lithium into the negative electrode active material with an appropriate flow of electrons to maintain electrical neutrality. Due to the electropositive nature of the elemental lithium, voltage may or may not be applied across the electrode to provide for the lithiation of the negative electrode. If the elemental lithium metal is associated with the positive electrode, an electrical connection between the positive electrode and the negative electrode can provide for consumption of the elemental lithium metal in the positive electrode and deposition of lithium in the negative electrode while providing electrical neutrality. The insertion of lithium into the negative electrode from elemental lithium in the positive electrode or a sacrificial electrode can be performed along with the charging step to prepare the positive electrode active material and the negative electrode active material for cycling.

During the process of placing supplemental lithium into the ultimate negative electrode for the lithium ion battery, the negative electrode can be associated in some embodiments with a sacrificial electrode, which can comprise elemental lithium or alloy thereof, and/or a positive electrode with a lithium sacrificial material. In these configurations, the "negative electrode" of the ultimate battery, may be in a configuration in which the "ultimate negative electrode" is associated with a cell opposite a lithium based electrode for the intercalation/alloying of lithium into the electrode. For such a lithiation cell, the ultimate negative electrode may not be configured as a negative electrode. However, the electrode can still be identified as the ultimate negative electrode regardless of intermediate processing of the electrode structure that can involve desired electrochemical manipulations.

Also, a sacrificial material can be used in the positive electrode or a sacrificial electrode to supply supplemental lithium to the battery for incorporation at least partially into the negative electrode. In general, any material that provides an electrochemical lithium source can act as a sacrificial source of supplemental lithium, but certain lithium sources can be desirable. It can be desirable to select a sacrificial material that is not expected to cycle during normal operation of the battery over its voltage range. For example, sacrificial compositions that are more electropositive can react during the charge cycle, and these materials are not likely to cycle after the first cycle in the positive electrode. Also, a high specific capacity sacrificial material can be useful since a reduced amount of non-cycling weight is introduced into the cathode, and the cycling properties of the sacrificial material are not expected to be significant. Thus, suitable sacrificial materials can include, for example, lithium titanium oxide, lithiated silicon, $LiCoO_2$, $LiFePO_4$, and the like. While elemental lithium metal has a very high energy density, lithium metal generally involves special handling procedures due to lithium's reactivity. The replacement of elemental lithium, which can react violently with moisture, with a more stable lithium source material can be desirable from a handling perspective. The transfer of the lithium from the sacrificial material to the negative electrode involves an electrical connection between the positive electrode and/or a sacrificial electrode as appropriate along with a suitable applied voltage to drive the reactions to charge the negative electrode with the lithium from the sacrificial material, based in a straightforward way on the electronegativity of the respective half reactions.

Alternatively or additionally, the ultimate negative electrode can be prelithiated prior to battery assembly. In general, this prelithiation of the ultimate negative electrode active material prior to battery assembly involves an electrochemical placement of the lithium into the ultimate negative electrode active material. For example, the ultimate negative electrode can be placed in electrochemical contact with a lithium source, such as a lithium foil. As shown in the examples, a separator can be placed between the anode and the lithium foil, and an electrical connection can be supplied to provide for the deposition of lithium into the ultimate negative electrode active material. The amount of current allowed to flow between the elemental lithium metal source and the ultimate negative electrode can be controlled to introduce a desired amount of lithium into the ultimate negative electrode. A potential may or may not be applied between the elemental lithium metal source and the ultimate negative electrode to facilitate the transfer of lithium into the ultimate negative electrode. However, other approaches can be used since the lithium is reactive and can be used to drive lithium into the ultimate negative electrode active material along with the formation of an SEI layer. Other lithium sources can also be used to electrochemically drive lithium into the ultimate negative electrode active material prior to assembly of the ultimate battery, and an appropriate voltage may be used for some of these lithium sources to drive the reaction.

As described further below, experiments suggest that the supplemental lithium is gradually consumed during cycling. To retain the effectiveness of the supplemental lithium to longer numbers of cycles, it can be desirable to load the negative electrode with a moderately large amount of supplemental lithium. Thus, in general, it is desirable to load the negative electrode with supplemental lithium corresponding to at least about 3% of the capacity of the negative electrode active material, and up to 50% or greater of the capacity of the negative electrode active material can be loaded with supplemental lithium. The total capacity of the negative electrode active material generally can be at least about 3% larger than the sum of the equivalence from supplemental lithium and the theoretical capacity of the positive electrode active material.

In traditional lithium ion batteries, all of the lithium other than a dissolved portion that generally remains in the electrolyte is supplied initially by the positive electrode active material. The battery then is initially charged such that the lithium is transferred to the negative electrode active material under a charging potential. The negative electrode active material intercalates, alloys or otherwise incorporates the lithium into its structure. Upon the transfer of the lithium to the negative electrode active material, the lithium is available to facilitate the discharge of the battery as the lithium is transferred back to the positive electrode active material with the release of electrochemical energy that can be used to generate useful work.

As in conventional lithium ion batteries, for the batteries described herein, the positive electrode active material generally is initially fully lithiated such that the battery is initially charged to prepare the positive electrode for subsequent discharge. It is surprisingly found that the inclusion of the supplemental active lithium in the negative electrode can greatly stabilize the battery during cycling out to very large numbers of cycles. While not wanting to be limited by theory, evidence provided herein indicates that this stability may be due to effects at both the positive electrode and the negative electrode.

It has been proposed to construct a battery with a lithium-depleted positive electrode active material, elemental lithium metal associated with the negative electrode and a lithium intercalation material, such as carbon, associated with the negative electrode. This battery structure is described further in U.S. Pat. No. 7,276,314 to Gao et al., entitled "Lithium Metal Dispersion in Secondary Battery Anodes," incorporated herein by reference. In these batteries, the lithium for cycling is provided by the initial lithium metal in the negative electrode. Similarly, the negative electrode intercalation material can be electrochemically loaded with lithium such that the negative electrode provides the lithium for cycling when combined with a lithium depleted positive electrode. Such a structure is described in U.S. Pat. No. 5,753,388 to Kockbang et al., entitled "Process for Prelithiation of Carbon Based Anodes for Lithium Ion Electrochemical Cells," incorporated herein by reference. These batteries do not provide supplemental lithium as described herein, but these batteries only provide an alternative approach for the introduction of the initial lithium into the battery.

In general, the positive electrode and negative electrode capacities are relatively balanced to avoid waste of materials, although a slight excess of negative electrode material can be used to avoid the deposition or plating of lithium metal during battery charging. It has been proposed to incorporate lithium metal into the battery to compensate for lithium related to SEI layer formation, which corresponds with irreversible capacity loss if the positive electrode active material is not lithium rich. For example, it has been proposed to incorporate an auxiliary lithium metal foil electrode in contact with the electrolyte but separated from the electrodes to compensate for irreversible capacity loss, as described in U.S. Pat. No. 6,335,115 to Meissner, entitled "Secondary Lithium-Ion Cell With an Auxiliary Electrode," incorporated herein by reference. A similar structure in which the lithium metal foil is placed in the cell as a lithium reservoir in electrical contact with the negative electrode is described in U.S. Pat. No. 6,025,093 to Herr, entitled "Lithium Ion Cell," incorporated herein by reference. Similarly, a layer of lithium has been proposed to compensate for the large irreversible capacity loss associated with hard carbon, as described in U.S. Pat. No. 6,737,191 to Gan et al., entitled "Double Current Collector Negative Electrode Design for Alkali Metal Ion Electrochemical Cells," incorporated herein by reference. A partial electrochemical prelithiation of the negative electrode intercalation material to compensate for irreversible capacity loss has been described in U.S. Pat. No. 5,743,921 to Nazri et al., entitled "Method of Making a Cell Using a Lithium-Deactivated Carbon Anode," incorporated herein by reference.

A battery structure with a composite positive electrode and composite negative electrode is described in U.S. Pat. No. 7,582,387 to Howard et al., entitled "Lithium-Ion Battery," incorporated herein by reference. The positive electrode has two active materials in which one is initially loaded with lithium while the other is not, and the negative electrode initially comprises lithium metal and an intercalation composition. It is asserted that this structure provides for charging and discharging stably over a broader potential range. In addition, a layer of elemental lithium metal has been proposed to stabilize the cycling of lithium ion cell, as described in U.S. Pat. No. 5,147,739 to Beard, entitled "High Energy Electrochemical Cell Having Composite Solid-State Anode," incorporated herein by reference. An elemental lithium coating associated with the surface of the negative electrode or negative electrode side of the separator was also proposed for the purpose of compensating for irreversible capacity loss as well as improving cycling. See, U.S. Pat. No. 5,948,569 to Moses et al., entitled "Lithium Ion Electrochemical Cell," incorporated herein by reference. The electrochemical incorporation of lithium into negative electrode active material or the lithium metal have been proposed to stabilize cycling through replacement of lithium lost as a result of irreversible capacity loss has been described in U.S. Pat. No. 5,162,176 to Herr et al., entitled "Electrochemical Secondary Element," incorporated herein by reference. The Herr '176 patent describes the use of the needle coke as the negative electrode cycling material, which has a large irreversible capacity loss.

However, if the irreversible capacity loss is dominated by irreversible changes to the positive electrode active material rather than the formation of an SEI layer, there would be no purpose in adding lithium to compensate for the irreversible capacity loss. In particular, the added lithium cannot be incorporated into the positive electrode active material during discharge. So the rational of compensating for irreversible capacity loss does not make sense in the context of the lithium rich positive electrode active materials described herein. However, much more significant results have been found when supplemental lithium is incorporated into batteries comprising the lithium rich metal oxides. In particular, the structure of the positive electrode active materials is significantly stabilized for reasons that are not presently understood.

When operated at lower voltages, lithium ion batteries incorporating the lithium rich metal oxides have been stabilized to obtain moderate cycling performance, as described in copending U.S. patent application Ser. No. 12/509,131, now published application no. 20110017528 to Kumar et al., entitled "Lithium Ion Batteries With Long Cycling Performance," incorporated herein by reference. Specifically, using a lithium rich metal oxide having an $AlF_3$ coating, reasonable cycling from 2.5V to 4.2V was obtained out to more than 1000 cycles. However, comparable long cycling performance at higher voltages with correspondingly higher capacities has been elusive before now. Also, further improvement in the cycling performance at lower voltage would also be desirable.

When operated at higher voltages to access a greater part of the capacity of the positive electrode active materials, the cycling performance has been observed to fade more rapidly. However, the inclusion of supplemental lithium in batteries with the lithium rich positive electrode active materials has amazingly resulted in the dramatic improvement in the cycling properties of the batteries even at high voltage operation. This surprising improvement has been found to correlate with stabilization of the positive electrode active material, although increased stability of the SEI layer is also suggested by the data. In particular, for batteries without the supplemental lithium, it is found that metals from the positive electrode active materials migrate to the negative electrode active materials, which indicates that the metals dissolute into the electrolyte indicating instability of the material. If the positive electrode active materials are unstable, the battery capacity would be expected to fade since the positive electrode would gradually not be able to take up the same quantities of lithium during a discharge step. It is observed that after cycling the batteries for a hundred cycles with supplemental lithium, non-lithium metal atoms from the positive electrode active materials make up no more than about 5 weight percent of the negative electrode active materials, which indicates that the positive electrode active materials are stable with respect to cycling. The supplemental lithium in the negative electrode provided additional capacity in the negative electrode during cycling even after discharging the battery to 2 volts. Thus, after cycling for 20 cycles and discharging the battery to 2 volts, the negative electrode can be removed and further de-intercalated/de-alloyed against lithium to remove at least about 0.5 percent of the total negative electrode capacity.

As described herein, the incorporation of supplemental lithium in batteries with lithium rich metal oxides stabilizes the cycling performance of the lithium batteries. This improved performance is obtained even for cycling at high voltage such that high specific capacities are also obtained. Using positive electrode materials that are stabilized with a coating, the high specific capacity cycling performance can be maintained for hundreds of cycles with little or no capacity fade. In particular, there is an observed synergistic effect with high capacity lithium rich positive electrode composition along with the supplemental lithium that results in the extremely stable cycling properties.

It is useful to note that during charge/discharge measurements, the specific capacity of a material depends on the rate of discharge. The highest specific capacity of a particular material is measured at very slow discharge rates. In actual use, the actual specific capacity is less than the maximum value due to discharge at a faster rate. More realistic specific capacities can be measured using reasonable rates of discharge that are more similar to the rates encountered during actual use. For example, in low to moderate rate applications, a reasonable testing rate involves a discharge of the battery over three hours. In conventional notation this is written as C/3 or 0.33 C. Faster or slower discharge rates can be used as desired, and the rates can be described with the same notation.

The inclusion of the added elemental lithium metal is observed to increase the reversible capacity at a selected operating voltage so that the productive specific capacity increases. Thus, for the lithium rich high capacity materials described herein, the discharge specific capacity can be high, e.g., greater than about 240 mAh/g. This high positive electrode specific capacity can be maintained for many cycles with little or no fade. In some embodiments, the positive electrode has a room temperature specific discharge capacity at the 200th cycle that is at least about 92.5% of the 5th cycle specific discharge capacity when discharged from the 5th cycle to the 200th cycle at a C/3 rate. In further embodiments, it has been found that the cycling stability of the specific discharge capacity is maintained at even greater discharge rates of 1 C and 2 C as well as at elevated temperatures, such as 55° C.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. The batteries described herein that incorporate improved positive electrode active materials with respect to specific capacity, tap density, and cycling can provide improved performance for consumers, especially for medium current applications. For some applications, such as hybrid vehicles, plug-in hybrid vehicles and electric vehicles, the batteries are a very significant cost, such that the improvements of the cycling of the batteries can significant decrease the lifetime cost of the use of the vehicle such that the vehicles become more accessible to a broader public.

Lithium Ion Battery Structure

Lithium ion batteries generally comprise a positive electrode, a negative electrode, a separator between the negative electrode and the positive electrode and an electrolyte comprising lithium ions. The electrodes are generally associated with metal current collectors, such as metal foils. Lithium ion batteries refer to batteries in which the negative electrode active material is a material that takes up lithium during charging and releases lithium during discharging. Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The basic battery structures and compositions are described in this section and modifications related to incorporation of supplemental lithium are described further below.

The nature of the negative electrode intercalation/alloying material influences the resulting voltage of the battery since the voltage is the difference between the half cell potentials at the cathode and anode. Suitable negative electrode (anode) lithium intercalation/alloying compositions can include, for example, graphite, synthetic graphite, coke, fullerenes, other graphitic carbons, niobium pentoxide, tin alloys, silicon, titanium oxide, tin oxide, and lithium titanium oxide, such as $Li_xTiO_2$, $0.5<x\le1$ or $Li_{1+x}Ti_{2-x}O_4$, $0\le x\le1/3$. The graphitic carbon and metal oxide negative electrode compositions take up and release lithium through an intercalation or similar process. Silicon and tin alloys form alloys with the lithium metal to take up lithium and release lithium from the alloy to correspondingly release lithium. Additional negative electrode materials are described in published U.S. patent applications 2010/0119942 to Kumar, entitled "Composite Compositions, Negative Electrodes with Composite Compositions and Corresponding Batteries," and 2009/0305131 to Kumar et al., entitled "High Energy Lithium Ion Batteries with Particular Negative Electrode Compositions," both of which are incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders and polymer binders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm² (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent application Ser. No. 12/630,992, now published application no. 20110136019 filed on Dec. 4, 2009 to Amiruddin et al. (the '992 application), entitled "Lithium Ion Battery With High Voltage Electrolytes and Additives," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s).

In some embodiments, the positive electrode and negative electrode can be stacked with the separator between them, and the resulting stacked structure can be placed into a cylindrical or prismatic configuration to form the battery structure. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used. Pouch batteries can be constructed as described in published U.S. patent application 2009/0263707 to Buckley et al, entitled "High Energy Lithium Ion Secondary Batteries", incorporated herein by reference.

Positive Electrode Active Compositions

In some embodiments, the lithium ion battery positive electrode materials can be any reasonable positive electrode active material, such as stoichiometric layered cathode materials with hexagonal lattice structures, such as $LiCoO_2$, $LiNiO_2$, $LiMnO_2$, or the like; cubic spinel cathode materials such as $LiMn_2O_4$, $Li_4Mn_5O_{12}$, or the like; olivine $LiMPO_4$ (M=Fe, Co, Mn, combinations thereof and the like) type materials; layered cathode materials such as $Li_{1+x}(NiCoMn)_{0.33-x}O_2$ (0≤x<0.3) systems; layer-layer composites, such as $xLi_2MnO_3 \cdot (1-x)LiMO_2$ where M can be Ni, Co, Mn, combinations thereof and the like; and composite structures like layered-spinel structures such as $LiMn_2O_4 \cdot LiMO_2$. In additional or alternative embodiments, a lithium rich composition can be referenced relative to a composition $LiMO_2$, where M is one or more metals with an average oxidation state of +3. Generally, the lithium rich compositions can be represented approximately with a formula $Li_{1+x}M_{1-y}O_2$, where M represents one or more non-lithium metals and y is related to x based on the average valance of the metals. In some embodiments, x is from about 0.01 to about 0.33, and y is from about x−0.2 to about x+0.2 with the proviso that y≥0. In the layered-layered composite compositions, x is approximately equal to y. In general, the additional lithium in the lithium rich compositions is accessed at higher voltages such that the initial charge takes place at a relatively higher voltage to access the additional capacity.

Lithium rich positive electrode active materials of particular interest can be represented approximately by a formula $Li_{1+b}Ni_\alpha Mn_\beta Co_\gamma A_\delta O_{2-z}F_z$, where b ranges from about 0.01 to about 0.3, α ranges from about 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above contemplated and are within the present disclosure. To simplify the following discussion in this section, the optional fluorine dopant is not discussed further. Desirable lithium rich compositions with a fluorine dopant are described further in copending U.S. patent application Ser. No. 12/569,606, now published application no. 20100086854 to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in copending U.S. patent application Ser. No. 12/870,295, now published application no. 20110052989 to Venkatachalam et al., entitled "Lithium Doped Cathode Material," incorporated herein by reference. The specific performance properties obtained with +2 metal cation dopants, such as $Mg^{+2}$, are described in copending U.S. patent application Ser. No. 12/753,312, now published application no. 20110244331 to Karthikeyan et al., entitled "Doped Positive Electrode Active Materials and Lithium Ion Secondary Batteries Constructed Therefrom," incorporated herein by reference.

If b+α+β+γ+δ is approximately equal to 1, the positive electrode material with the formula above can be represented approximately in two component notation as x $Li_2M'O_3 \cdot (1-x)LiMO_2$ where 0<x<1, M is one or more metal cations with an average valance of +3 within some embodiments at least one cation being a Mn ion or a Ni ion and where M' is one or more metal cations, such as $Mn^{+4}$, with an average valance of +4. It is believed that the layered-layered composite crystal structure has a structure with the excess lithium supporting the stability of the material. For example, in some embodiments of lithium rich materials, a $Li_2MnO_3$ material may be structurally integrated with a layered $LiMO_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," incorporated herein by reference.

Recently, it has been found that the performance properties of the positive electrode active materials can be engineered around the specific design of the composition stoichiometry. The positive electrode active materials of particular interest can be represented approximately in two component notation as x $Li_2MnO_3 \cdot (1-x)$ $LiMO_2$, where M is one or more metal elements with an average valance of +3 and with one of the metal elements being Mn and with another metal element being Ni and/or Co. In general, 0<x<1, but in some embodiments 0.03≤x≤0.55, in further embodiments 0.075≤x≤0.50, in additional embodiments 0.1≤x≤0.45, and in other embodiments 0.15≤x≤0.425. A person of ordinary skill in the art will recognize that additional ranges within the explicit ranges of parameter x above are contemplated and are within the present disclosure. For example, M can be a combination of nickel, cobalt and manganese, which, for example, can be in oxidation states $Ni^{+2}$, $Co^{+3}$, and $Mn^{+4}$ within the initial lithium manganese oxides. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich.

In some embodiments, M can be written as $Ni_uMn_vCo_wA_y$. For embodiments in which y=0, this simplifies to $Ni_uMn_vCo_w$. If M includes Ni, Co, Mn, and optionally A the composition can be written alternatively in two component notation and single component notation as the following.

$$xLi_2MnO_3 \cdot (1-x)LiNi_uMn_vCo_wA_yO_2, \quad (1)$$

$$Li_{1+b}Ni_\alpha Mn_\gamma Co_\gamma A_\delta O_2, \quad (2)$$

with $u+v+w+y \approx 1$ and $b+\alpha+\beta+\gamma+\delta \approx 1$. The reconciliation of these two formulas leads to the following relationships:

$$b=x/(2+x),$$

$$\alpha=2u(1-x)/(2+x),$$

$$\beta=2x/(2+x)+2v(1-x)/(2+x),$$

$$\gamma=2 w(1-x)/(2+x),$$

$$\delta=2 y(1-x)/(2+x),$$

and similarly, $$x=2b/(1-b),$$

$$u=\alpha/(1-3b),$$

$$v=(\beta-2b)/(1-3b),$$

$$w=\gamma/(1-3b),$$

$$y=\delta/(1-3b).$$

In some embodiments, it may be desirable to have $u \approx v$, such that $Li\ Ni_uMn_vCo_wA_yO_2$ becomes approximately $Li\ Ni_uMn_uCo_wA_yO_2$. In this composition, when y=0, the average valance of Ni, Co and Mn is +3, and if $u \approx v$, then these elements can have valances of approximately $Ni^{+2}$, $Co^{+3}$ and $Mn^{+4}$ to achieve the average valance. When the lithium is hypothetically fully extracted, all of the elements go to a +4 valance. A balance of Ni and Mn can provide for Mn to remain in a +4 valance as the material is cycled in the battery. This balance avoids the formation of $Mn^{+3}$, which has been associated with dissolution of Mn into the electrolyte and a corresponding loss of capacity.

In further embodiments, the composition can be varied around the formula above such that $Li\ Ni_{u+\Delta}Mn_{u-\Delta}Co_wA_yO_2$, where the absolute value of $\Delta$ generally is no more than about 0.3 (i.e., $-0.3 \leq \Delta \leq 0.3$), in additional embodiments no more than about 0.2 ($-0.2 \leq \Delta \leq 0.2$) in some embodiments no more than about 0.175 ($-0.175 \leq \Delta \leq 0.175$) and in further embodiments no more than about 0.15 ($-0.15 \leq \Delta \leq 0.15$). Desirable ranges for x are given above. With $2u+w+y \approx 1$, desirable ranges of parameters are in some embodiments $0 \leq w \leq 1$, $0 \leq u \leq 0.5$, $0 \leq y \leq 0.1$ (with the proviso that both $u+\Delta$ and w are not zero), in further embodiments, $0.1 \leq w \leq 0.6$, $0.1 \leq u \leq 0.45$, $0 \leq y \leq 0.075$, and in additional embodiments $0.2 \leq w \leq 0.5$, $0.2 \leq u \leq 0.4$, $0 \leq y \leq 0.05$. A person of ordinary skill in the art will recognize that additional ranges of composition parameters within the explicit ranges above are contemplated and are within the present disclosure. As used herein, the notation (value1≤variable≤value2) implicitly assumes that value 1 and value 2 are approximate quantities. The engineering of the composition to obtain desired battery performance properties is described further in the '976 application cited above.

A co-precipitation process has been performed for the desired lithium rich metal oxide materials described herein having nickel, cobalt, manganese and additional optional metal cations in the composition and exhibiting the high specific capacity performance. In addition to the high specific capacity, the materials can exhibit a good tap density which leads to high overall capacity of the material in fixed volume applications. Specifically, lithium rich metal oxide compositions formed by the co-precipitation process were used in coated forms to generate the results in the Examples below.

Specifically, the synthesis methods based on co-precipitation have been adapted for the synthesis of compositions with the formula $Li_{1+b}Ni_\alpha Mn_\beta Co_\gamma A_\delta O_{2-z}F_z$, as described above. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in the '853 application referenced above. Further details of the carbonate co-precipitation process are described in the '332 application referenced above.

Coatings and Formation of Coatings

Inorganic coatings, such as metal halide coatings and metal oxide coatings, have been found to significantly improve the performance of lithium ion batteries, although the coatings are believed to be inert with respect to battery cycling. In particular, the cycling properties of the batteries formed from coated lithium metal oxide have been found to significantly improve from the uncoated material. Additionally, the specific capacity of the batteries also shows desirable properties with the coatings, and the irreversible capacity loss of the first cycle of the battery can be reduced in some embodiments. In the Examples below, performance properties are obtained for the active materials coated with magnesium fluoride, $MgF_2$, and with aluminum fluoride, $AlF_3$.

With respect to metal oxide and metal halide coatings, a coating with a combination of metal and/or metalloid elements can be used for the coating compositions. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930A to Sun et al., entitled "Cathode Active Materials Coated with Fluorine Compound for Lithium Secondary Batteries and Method for Preparing the Same," incorporated herein by reference. It has been found that metal/metalloid fluoride coatings can significantly improve the performance of lithium rich layered compositions for lithium ion secondary batteries. See, for example, the '853 application and the '332 application cited above, as well as the '226 application. Desirable performance results for non-fluoride metal halide coatings have been described in copending U.S. patent application Ser. No. 12/888,131 to Venkatachalum et al., entitled "Metal Halide Coatings on Lithium Ion Battery Positive Electrode Materials and Corresponding Batteries," incorporated herein by reference.

An increase in capacity and a reduction in irreversible capacity loss were noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. The use of a $LiNiPO_4$ coating to obtain improved cycling performance is described in an article to Kang et al. "Enhancing the rate capability of high capacity $xLi_2MnO_3$ $(1-x)LiMO_2$ (M=Mn, Ni, Co) electrodes by Li—Ni—$PO_4$ treatment," Electrochemistry Communications 11, 748-751 (2009), incorporated herein by reference, and this article can be referenced generally with respect to the formation of metal phosphate coatings. Desirable properties of metal oxide coatings on lithium rich positive electrode active materials are described further in copending U.S. patent application Ser. No. 12/870,096, now published application no. 20110076556 to Karthikeyan et al., entitled "Metal Oxide Coated Positive electrode Materials for Lithium-Based Batteries," incorporated herein by reference.

In some embodiments, the coating improves the specific capacity of the batteries even though the coating itself is not electrochemically active. However, the coatings also influence other properties of the active material, such as the average voltage, thermal stability and impedance. The selection of the coating properties can incorporate additional factors related to the overall range of properties of the material.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of coating materials to achieve desired improvement in battery performance can be related to the particle size and surface area of the uncoated material. Further discussion of the effects of coating thickness on the performance properties for coated lithium rich lithium metal oxides is found in the '226 application cited above.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Ultimate Negative Electrode and Supplemental Lithium

The general formation of an ultimate negative electrode for a lithium ion battery is described above. Also as noted above, various approaches can be used for the introduction of supplemental lithium into the battery, although following corresponding initial reactions and/or charging, the ultimate negative electrode becomes charged with excess lithium for cycling from the supplemental lithium. With respect to the ultimate negative electrode in batteries having supplemental lithium, the structure and/or composition of the ultimate negative electrode can change relative to its initial structure and composition following the first cycle as well as following additional cycling. Depending on the approach for the introduction of the supplemental lithium, the positive electrode may initially include a source of supplemental lithium and/or a sacrificial electrode can be introduced comprising supplemental lithium.

With respect to initial structure of the ultimate negative electrode, in some embodiments, the negative electrode has no changes due to the supplemental lithium. In particular, if the supplemental lithium is initially located in the positive electrode or a separate electrode, the negative electrode can be an unaltered form with no lithium present until the battery is charged or at least until the circuit is closed between the ultimate negative electrode and the electrode with the supplemental lithium in the presence of electrolyte and a separator. For example, the positive electrode or supplemental electrode can comprise elemental lithium, lithium alloy and/or other sacrificial lithium source.

Figure 2:
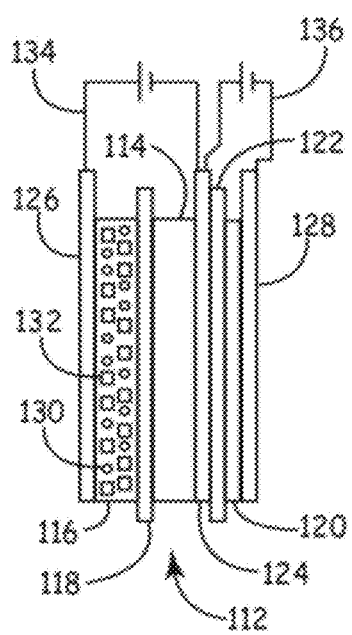
FIG. 2 is schematic side view of an electrode stack with an optional sacrificial electrode and optional supplemental lithium within the cathode, i.e. positive electrode.

A schematic diagram of a cell with a lithium source external to the ultimate negative electrode is shown in FIG. 2. Cell 112 comprises ultimate negative electrode 114, positive electrode 116, first separator 118 between ultimate negative electrode 114 and positive electrode 116, optional sacrificial electrode 120 and optional second separator 122 between ultimate negative electrode 114 and sacrificial electrode 120. Cell 112 further comprises current collectors 124, 126, 128 associated respectively with ultimate negative electrode 114, positive electrode 116 and sacrificial electrode 120. In some embodiments, positive electrode 116 comprises a supplemental lithium source 130 in addition to the positive electrode active material 132. External circuit 134 connects ultimate negative electrode 114 and positive electrode 116, and external circuit 136 connects ultimate negative electrode 114 and sacrificial electrode 120. Sacrificial electrode 120 can comprise lithium foil and/or other supplemental lithium source, which may be supported with a polymer binder.

A cell, such as shown schematically in FIG. 2, can be contacted with an appropriate electrolyte in an appropriate vessel, such as a battery housing, beaker or other suitable vessel in an assembly to hold the electrodes together if not held together with a housing. If a sacrificial electrode is present, external circuit 136 can be closed to intercalate/alloy lithium into the ultimate negative electrode from the sacrificial electrode. In general, the sacrificial electrode can have a selected fraction of the capacity of the ultimate negative electrode such that a desired amount of supplemental lithium can be deposited into the negative electrode. A portion of the lithium from the sacrificial electrode can be consumed in formation of an SEI layer, which can be partially or fully formed during the charge from the sacrificial electrode. The current can be flowed between the sacrificial electrode and the ultimate negative electrode at a constant current, constant voltage or other desired rate. After the priming of the ultimate negative electrode using the sacrificial electrode is complete, external circuit 136 generally is disconnected and not used further.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of an external voltage since oxidation of the elemental lithium drives the reaction. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage, such as 4.5V.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. After the negative electrode is in contact with electrolyte, a reaction can take place, and the supplemental lithium is transferred to the negative electrode active material. During this process, the SEI layer is also formed. Thus, the supplemental lithium is loaded into the negative electrode active material with at least a portion consumed in formation of the SEI layer. The excess lithium released from the lithium rich positive electrode active material is also deposited into the negative electrode active material during eventual charging of the battery. The supplemental lithium placed into the negative electrode should be more electronegative than the active material in the negative electrode since there is no way of reacting the supplemental lithium source with the active material in the same electrode through the application of a voltage.

Figure 3:
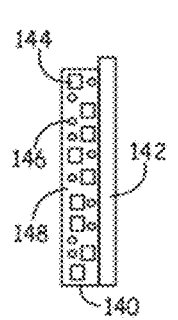
FIG. 3 is a schematic side view of an anode, i.e., negative electrode, on a current collector in which the negative electrode comprises a supplemental lithium source within the body of the electrode.
Figure 4A:
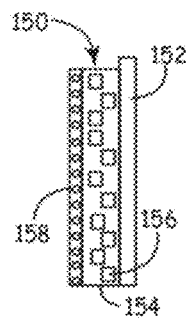
FIG. 4A is a schematic side view of a negative electrode on a current collector in which the negative electrode comprises a layer of supplemental lithium on the surface of the negative electrode.
Figure 4B:
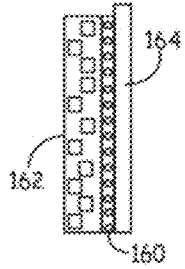
FIG. 4B is a schematic side view of a negative electrode on a current collector in which the negative electrode comprises a layer of supplemental lithium between the negative electrode and the current collector.

Supplemental lithium associated with the negative electrode can be incorporated as a powder within the negative electrode, and such a structure is shown schematically in FIG. 3. Referring to FIG. 3, negative electrode 140 is associated with current collector 142. Negative electrode 140 comprises active negative electrode composition 144 and supplemental lithium source 146 within a polymer binder matrix 148, and any electrically conductive powder if present is not shown. In additional or alternative embodiments, the supplemental lithium is placed along the surface of the electrode, as shown in FIGS. 4A and 4B. Referring to FIG. 4A, negative electrode 150 is placed on current collector 152. Negative electrode 150 comprises an active layer 154 with an active negative electrode composition 156 and supplemental lithium source layer 158 on the surface of active layer 154. Supplemental lithium source layer 158 can comprise a foil sheet of lithium or lithium alloy, supplemental lithium powder within a polymer binder and/or particles of supplemental lithium source material embedded on the surface of active layer 154. An alternative configuration is shown in FIG. 4B in which supplemental lithium source layer 160 is between active layer 162 and current collector 164. Also, in some embodiments, the negative electrode can comprise supplemental lithium source layers on both surfaces of the active layer, which is essentially a combination of the embodiments in FIGS. 4A and 4B.

Figure 5:
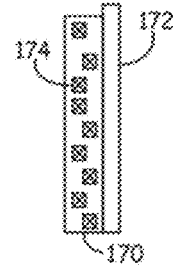
FIG. 5 is a schematic side view of a negative electrode on a current collector in which the negative electrode active material is partially lithiated.

In additional embodiments, at least a portion of the supplemental lithium can be supplied to the ultimate negative electrode active material prior to assembly of the battery. An electrode with partially preloaded lithium is shown schematically in FIG. 5. As shown in FIG. 5, ultimate negative electrode 170 is in contact with current collector 172. Ultimate negative electrode 170 comprises partially loaded active material 174, in which the partially loaded active material has a selected degree of loading of lithium through intercalation/alloying or the like.

Figure 6:
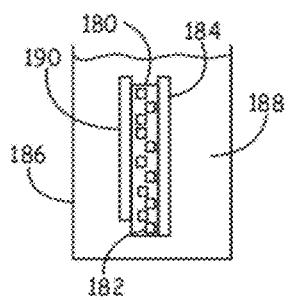
FIG. 6 is a schematic view of a vessel with electrolyte holding a negative electrode with a sheet of lithium source material contacting the negative electrode to perform lithiation of the negative electrode.

For example, for the preloading of the ultimate negative electrode active material, the ultimate negative electrode active material can be contacted with electrolyte and a lithium source, such as elemental lithium, lithium alloy or other sacrificial lithium source that is more electronegative than the ultimate negative electrode active material. An experimental arrangement to perform such a preloading of lithium is shown schematically in FIG. 6. Electrode 180 with active material 182 formed on current collector 184 is placed in vessel 186 containing electrolyte 188 and a sheet of lithium source material 190 contacting electrode 180. The sheet of lithium source material can comprise lithium foil, lithium alloy foil or a lithium source material in a polymer binder optionally along with an electrically conductive powder, which is in direct contact with the ultimate negative electrode to be preloaded with lithium such that electrons can flow between the materials to maintain electrical neutrality while the respective reactions take place, and ultimate negative electrode 180 should also have contact with electrolyte 188 to provide for ion transfer. In the ensuing reaction, lithium is loaded into the ultimate negative electrode active material through intercalation, alloying or the like. In alternative or additional embodiments, the ultimate negative electrode active material can be mixed in the electrolyte and the lithium source material for incorporation of the supplemental lithium prior to formation into an electrode with a polymer binder so that the respective materials can react in the electrolyte spontaneously.

Figure 7:
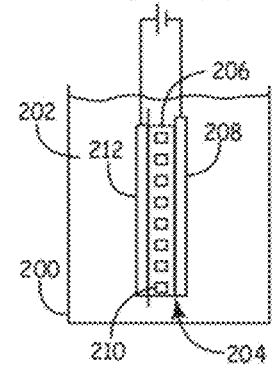
FIG. 7 is a schematic view of a vessel with electrolyte and a cell comprising an electrode to be lithiated and a lithium source electrode separated with a separator and connected through an external circuit, in which the electrode to be lithiated will subsequently be used as a negative electrode in a final battery.

In some embodiments, the lithium source within an electrode can be assembled into a cell with the ultimate negative electrode to be preloaded with lithium. A separator can be placed between the respective electrodes. Current can be allowed to flow between the electrodes. Depending on the composition of the lithium source it may or may not be necessary to apply a voltage to drive the lithium deposition within the ultimate negative electrode active material, although it may be desirable to apply a voltage nevertheless to control the rate of reaction. An apparatus to perform this lithiation process is shown schematically in FIG. 7. Referring to FIG. 7, container 200 holds electrolyte 202 and cell 204. Cell 204 comprises ultimate negative electrode 206, current collector 208, separator 210 and sacrificial electrode 212 that comprises the lithium source. A convenient sacrificial electrode comprises lithium foil, lithium powder embedded in a polymer or lithium alloys, although any electrode with extractable lithium can be used.

The container for the lithiation cell can comprise a conventional battery housing, a beaker, or any other convenient structure. While a conventional battery housing can provide a low internal impedance due to appropriate designs, the housing is eventually opened to remove the negative electrode for assembly of the final battery structure. The separator is not needed as long as the electrodes are electrically isolated, but the close proximity of the electrodes can reduce internal impedance. This configuration provides the advantage of being able to measure the current flow to meter the degree of lithiation of the ultimate negative electrode. Furthermore, the ultimate negative electrode can be cycled once or more than once in which the ultimate negative electrode active material is loaded close to full loading with lithium. In this way, the SEI layer can be formed with a desired degree of control during the preloading with lithium of the ultimate negative electrode active material. In this way, the ultimate negative electrode is fully formed during the preparation of the ultimate negative electrode with a selected preloading with lithium.

In summary, the initial negative electrode assembled into the battery for cycling can have a structure with no supplemental lithium associated with the electrode, a structure with supplemental lithium that is not associated with the active material for cycling or a structure in which at least a portion of the supplemental lithium is inserted into the negative electrode active material and the SEI layer is partially or fully formed. If the negative electrode initially is associated with supplemental lithium that is not associated with the active material for cycling, the reaction to insert the supplemental lithium into the active material and for SEI formation generally can begin once the battery is infused with electrolyte. In any case, by the completion of the first charge cycle, the supplemental lithium is generally associated with the negative electrode active material, and the SEI layer is generally formed.

In general, the lithium source can comprise, for example, elemental lithium, a lithium alloy or a lithium composition, such as a lithium metal oxide, that can release lithium from the composition. Elemental lithium can be in the form of a foil and/or a powder. Elemental lithium, especially in powder form, can be coated to stabilize the lithium for handling purposes, and commercial lithium powders, such as powders from FMC Corporation, are sold with proprietary coatings for stability. The coatings generally do not alter the performance of the lithium powders for electrochemical applications. Lithium alloys include, for example, lithium silicon alloys and the like. Lithium composition with intercalated lithium can be used in some embodiments, and suitable compositions include, for example, lithium titanium oxide, lithium tin oxide, and the like.

In general, the amount of supplemental lithium preloaded or available to load into the negative electrode active composition can be in an amount of at least about 2.5% of capacity, in further embodiments from about 3 percent to about 90 percent of capacity and in additional embodiments from about 5 percent to about 80 percent of the negative electrode active material capacity. Another parameter of interest related to the total balance of the negative electrode active material against the total available active lithium, which is the sum of the supplemental lithium and the positive electrode theoretical capacity. In some embodiments, the total available active lithium can be no more than about 110 percent of the negative electrode capacity, in further embodiments, no more than 105 percent and in further embodiments, from about 65 percent to about 100 percent and in further embodiments from about 70 to about 97.5 percent of the negative electrode active capacity. In some traditional batteries, the negative electrode is balanced at 107% of positive electrode capacity, which corresponds with 93.5% active lithium relative to the negative electrode capacity. While values of active lithium greater than 100% of the negative electrode capacity can result in plating of lithium in the negative electrode, evidence herein indicates that lithium is consumed with cycling so a modest amount of initial lithium that may plate in the negative electrode may be consumed prior to dendrite formation. A person of ordinary skill in the art will recognize that additional ranges of lithium preloading within the explicit ranges above are contemplated and are within the present disclosure.

The supplemental lithium can be detected in the negative electrode after cycling the battery. After discharging the battery, the positive electrode active material is essentially loaded with the lithium that can be accepted back into the positive electrode active material over the operating voltage range of the cell. In some embodiments, the battery can be discharged to 2V, or as an alternative expression, to a state discharged 98% of the discharge capacity. If no supplemental lithium is included in the battery, after formation and cycling, some excess lithium remains in the negative electrode presumably due to the irreversible changes to the lithium rich active compositions in the positive electrode in excess of lithium that is consumed for SEI layer formation. If supplemental lithium is included, significantly greater amounts of excess lithium can be detected in the negative electrode after discharge. The amount of excess lithium has been found to diminish with further cycling. The excess lithium can be determined by removing the negative electrode and de-intercalating/de-alloying the negative electrode against lithium metal. After 20 cycles over the selected voltage range of the battery, such as between 4.5V and 2V, the battery can be discharged, and the negative electrode harvested to measure its residual capacity. In particular, the battery can be discharged to 98% of the discharge capacity prior to disassembly. After retrieval of the negative electrode, the negative electrode can have a residual capacity of at least about 0.5% of the total capacity, in further embodiments at least about 1% and in additional embodiments at least about 2%. It is not necessary to harvest the entire negative electrode since the percent capacity can be evaluated for a portion of the electrode. After de-intercalation/de-alloying, the electrode can be fully loaded with lithium up to an appropriate voltage to measure the full capacity to obtain the percentage residual capacity. After 500 cycles between 4.5V and 2V, the negative electrode can have a capacity of 0.2%, in further embodiments at least about 0.25% and in additional embodiments at least about 0.5%. A person of ordinary skill in the art will recognize that additional ranges of discharged negative electrode residual capacities within the explicit ranges above are contemplated and are within the present disclosure.

The presence of the supplemental lithium during cycling is observed to stabilize the cycling of the battery and in particular for the stability of the positive electrode. In particular, it has been found that the transition metals leach from the lithium rich positive electrode material into the electrolyte. The transition metals in the electrolyte can be deposited in the negative electrode. The supplemental lithium stabilizes the transition metals in the positive electrode active material such that the incorporation of the transition metals into the electrolyte and correspondingly the negative electrode is reduced or eliminated. Thus, in some embodiments, after 500 charge/discharge cycles of battery between 4.5V and 2 V, the negative electrode comprises no more than about 5 weight percent transition metals, in further embodiments no more than about 2.5 weight percent, in additional embodiments no more than about 2 weight percent and in other embodiments no more than about 1 weight percent transition metals in the negative electrode. A person of ordinary skill in the art will recognize that additional ranges of transition metal concentrations within the explicit ranges above are contemplated and are within the present disclosure.

Differential scanning calorimetry measurements suggest that the initially formed SEI layer is more stable if supplemental lithium is present. In particular, if the anode material is removed after a formation charge step, the negative electrode active material does not have a rise in heat flow above baseline heat capacity below 110° C. if supplemental lithium is present. If the SEI layer is formed with the lithium rich negative electrode active material and no supplemental lithium, a rise in heat flow has been observed as low as about 100° C. If the SEI layer is formed by electrochemical lithiation of the negative electrode active material separate from the cathode active material, the SEI layer has been found to be particularly stable with stability observed to above 130° C.

Battery Properties

Batteries formed from lithium rich positive electrode active materials and supplemental lithium have demonstrated desirable performance under realistic discharge conditions. Specifically, the active materials have demonstrated a high specific capacity upon cycling of the batteries at moderate discharge rates. In particular, the initial specific capacity of the positive electrode active material is approximately unchanged when supplemental lithium is included. The irreversible capacity loss on the first cycle decreases. Also, the specific capacity on cycling significantly improves with inclusion of supplemental lithium.

As noted above, the irreversible capacity loss is the difference between the first charge specific capacity and the first discharge specific capacity. With respect to the values described herein, the irreversible capacity loss is in the context of the positive electrode active materials, which is evaluated relative to a lithium metal negative electrode. In some embodiments, the irreversible capacity loss is no more than about 30 mAh/g, in further embodiments no more than about 25 mAh/g, and in other embodiments no more than about 15 mAh/g. A person of ordinary skill in the art will recognize that additional ranges of irreversible capacity loss are contemplated and are within the present disclosure.

In general, various similar testing procedures can be used to evaluate the capacity performance of the battery positive electrode materials. Suitable testing procedures are described in more detail in the examples below. Specifically, the battery can be cycled between 4.5 volts and 2 volts at room temperature, although other ranges can be used with correspondingly different results, and the first cycle is charged and discharged at a rate of C/10, the second and third cycles have a charge/discharge rate of C/5 and subsequent cycling is at a rate of C/3 unless specified otherwise with charging at C/3. As noted above, the specific discharge capacity is very dependent on the discharge rate. Again, the notation C/x implies that the battery is discharged at a rate to fully discharge the battery to the selected voltage minimum in x hours.

In some embodiments, the initial specific capacity is significantly dependent on the composition of the lithium rich positive electrode active material. Based on the inclusion of the supplemental lithium, the fade of the specific capacity is dramatically reduced relative to a corresponding battery without the supplemental lithium. In some embodiments, the room temperature specific discharge capacity at the 200th cycle from 4.5 volts to 2 volts is at least about 92.5% of the 5th cycle specific discharge capacity at a C/3 rate, and in further embodiments at the 400th cycle at least about 90% of the 5th cycle discharge capacity, cycled at a discharge rate of C/3. Also, the supplemental lithium can be effective to reduce fade at higher rates. Specifically, the positive electrode active materials can have a specific discharge capacity at the 175th cycle at least about 75% of 5th cycle specific capacity at a rate of 1 C discharged from 4.5V to 2.0V at room temperature, and in further embodiments at least about 85% of the 5th cycle specific capacity at a rate of 1 C discharged from 4.5 volts to 2 volts at room temperature. Good cycling has also been found at 55° C. Specifically, the specific capacity of the positive electrode active material at the 45th cycle can be at least about 90% and in further embodiments at least about 95% of the 5th cycle specific discharge capacity when discharged from the 5th cycle to the 45th cycle at a C/3 rate at a temperature of 55° C. A person of ordinary skill in the art will recognize that additional ranges of specific capacity are contemplated and are within the present disclosure.

The results below demonstrate the growth of discharge capacity in a voltage range from 2.5V to 3V. When supplemental lithium is present the capacity from this voltage range is relatively stable with cycling, while without supplemental lithium this contribution to the capacity diminishes relatively quickly with cycling. In some embodiments, from about 300 cycles to about 600 cycles the positive electrode active material has a specific discharge capacity of at least about 90 mAh/g between 3V and 2.5V, in other embodiments at least about 100 mAh/g and in further embodiments at least about 105 mAh/g. A person of ordinary skill in the art will recognize that additional ranges of discharge capacity within the explicit ranges above are contemplated and are within the present disclosure.

EXAMPLES

Example 1

Synthesis of Cathode Active Material

This example demonstrates the formation of a desired positive electrode active material using a carbonate or hydroxide co-precipitation process.

Stoichiometric amounts of metal precursors were dissolved in distilled water to form an aqueous solution with the metal salts in the desired molar ratios. Separately, an aqueous solution containing $Na_2CO_3$ and/or $NH_4OH$ was prepared. For the formation of the samples, one or both solutions were gradually added to a reaction vessel to form metal carbonate or hydroxide precipitates. The reaction mixture was stirred, and the temperature of the reaction mixture was kept between room temperature and 80° C. The pH of the reaction mixture was in the range from 6-12. In general, the aqueous transition metal solution had a concentration from 1M to 3M, and the aqueous $Na_2CO_3$/$NH_4OH$ solution had a $Na_2CO_3$ concentration of 1M to 4M and/or a $NH_4OH$ concentration of 0.2-2M. The metal carbonate or hydroxide precipitate was filtered, washed multiple times with distilled water, and dried at 110° C. for about 16 hrs to form a metal carbonate or hydroxide powder. Specific ranges of reaction conditions for the preparation of the samples are further outlined in Table 1, where the solution may not include both $Na_2CO_3$ and $NH_4OH$.

TABLE 1

| Reaction Process Condition | Values |
| --- | --- |
| Reaction pH | 6.0-12.0 |
| Reaction time | 0.1-24 hr |
| Reactor type | Batch |
| Reactor agitation speed | 200-1400 rpm |
| Reaction temperature | RT-80° C. |
| Concentration of the metal salts | 1-3M |
| Concentration of $Na_2CO_3$ | 1-4M |
| Concentration of $NH_4OH$ | 0.2-2M |
| Flow rate of the metal salts | 1-100 mL/min |
| Flow rate of $Na_2CO_3$ & $NH_4OH$ | 1-100 mL/min |

An appropriate amount of $Li_2CO_3$ or LiOH powder was combined with the dried metal carbonate or hydroxide powder and thoroughly mixed with a Jar Mill, double planetary mixer, or dry powder rotary mixer to form a homogenous powder mixture. A portion, e.g. 5 grams, of the homogenized powders was calcined in a step to form the oxide, followed by an additional mixing step to further homogenize the powder. The further homogenized powder was again calcined to form the highly crystalline lithium composite oxide. Specific ranges of calcination conditions are further outlined in Table 2 (scfh is a standard cubic foot per hour).

TABLE 2

| | Calcination Process Condition | Values |
| --- | --- | --- |
| $1^{st}$ Step | Temperature | 400-800° C. |
| | Time | 1-24 hr |
| | protective gas | Nitrogen or Air |
| | Flow rate of protective gas | 0-50 scfh |
| $2^{nd}$ Step | Temperature | 700-1100° C. |
| | Time | 1-36 hr |
| | protective gas | Nitrogen or Air |
| | Flow rate of protective gas | 0-50 scfh |

The positive electrode composite material particles thus formed generally have a substantially spherical shape and are relatively homogenous in size. The product composition was assumed to correspond to the portions of the metal reactants used to form the composition with the oxygen adjusting to yield the overall targeted oxidation state. The overall formula for these compositions can be written as x $Li_2MnO_3 \cdot (1-x)$ Li $Ni_uMn_vCo_wO_2$ (formula I) or $Li_{1+b}Ni_\alpha Co_\gamma Mn_\beta O_2$ (formula II). In the following examples, positive electrode active materials are use that correspond with X=0.3 with 51.90 mole percent manganese or X=0.5 with 65.63 mole percent manganese.

Example 2

Formation of Metal Fluoride Coated Positive Electrode Materials

As described in this example, a portion of the lithium metal oxide (LMO) composition synthesized as described in Example 1 were coated with a thin layer of either aluminum fluoride ($AlF_3$) or magnesium fluoride ($MgF_2$). With respect to aluminum fluoride coatings, for a selected amount of aluminum fluoride, an appropriate amount of saturated solution of aluminum nitrate was prepared in an aqueous solvent. The lithium metal oxide particles were then added into the aluminum nitrate solution to form a mixture. The mixture was mixed vigorously for a period of time to homogenize. The length of mixing depends on the volume of the mixture. After homogenization, a stoichiometric amount of ammonium fluoride was added to the homogenized mixture to form aluminum fluoride precipitate while retaining the source of fluorine. Upon the completion of the precipitation, the mixture was stirred at 80° C. for 5 h. The mixture was then filtered and the solid obtained was washed repeatedly to remove any un-reacted materials. The solid was calcined in nitrogen atmosphere at 400° C. for 5 h to form the $AlF_3$ coated lithium metal oxide material. Different thicknesses of $AlF_3$ below 25 nm have been used for these studies.

Samples of lithium metal oxide (LMO) particles synthesized as described in Example 1 were coated with 0.5 mole percent $MgF_2$. A stoichiometric amount of the magnesium nitrate was dissolved in water and mixed with the corresponding amount of the lithium metal oxide under constant stirring. Then, ammonium fluoride was added to the mixture slowly while continuing the stirring. After the addition of an excess of ammonium fluoride, the mixture was heated to about 80° C. for about 5 hours. After the deposition was completed, the mixture was filtered and calcined at 450° C. for 5 hours under a nitrogen atmosphere. Characterization of lithium rich LMO particles with an $MgF_2$ coating using x-ray diffraction and transmission electron microscopy is described in the '226 application. Generally, the positive electrode particles included nanocoating thicknesses less 25 nm.

Example 3

Battery Formation

This example describes the formation of coin cell batteries comprising a positive electrode comprising lithium metal oxide (LMO) and a negative electrode comprising graphitic carbon.

A positive electrode was formed from LMO oxide powders. Lithium metal oxide powders were synthesized as described in Example 2. The LMO powders were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film and a positive electrode material was formed by drying the laminated current collector in a vacuum oven at 110° C. for about two hours to remove NMP. The positive electrode material was pressed between rollers of a sheet mill to obtain a positive electrode with desired thickness. The dried electrode comprised at least about 75 weight percent active metal oxide, at least about 3 weight percent acetylene black, at least about 1 weight percent graphite, and at least about 2 weight percent polymer binder.

A negative electrode was formed from graphitic carbon. The negative electrode comprised at least about 75 weight percent graphite and at least about 1 weight percent acetylene black with the remaining portion of the negative electrode being polymer binder. The acetylene black was initially mixed with NMP solvent to form a uniform dispersion. The graphite and polymer were added to the dispersion to form a slurry. The slurry was applied to a copper foil to form the negative electrode after drying.

In some examples below, a battery with supplemental lithium was formed. Supplemental lithium was provided to the battery either electrochemically or by direct addition of lithium metal to the negative electrode. Electrochemical addition of supplemental lithium comprised intercalating lithium into the negative electrode prior to ultimate battery formation. In particular, a lithiation coin cell was formed comprising a graphitic carbon electrode as described above, an electrode formed from lithium foil, and a separator disposed between the graphitic carbon electrode and the lithium foil electrode. The lithiation coin cell was cycled three times. Each cycle comprised intercalation of lithium into the graphite to 5 mV and a de-intercalation to 1.5 V, with an initial open circuit voltage of about 3V. In this configuration, the graphitic carbon electrode acted as the positive electrode and the lithium electrode acted as the negative electrode. After the final de-intercalation, the lithiation cell was partially intercalated to obtain a desired percentage lithiation of the graphitic carbon electrode. The desired percentage lithiation was determined based upon the discharge (de-intercalation/de-alloying) capacity of the graphitic carbon electrode and the measured amount of intercalation during the final partial charge. After partial lithiation, the graphitic carbon electrode was removed from the lithiation coin cell and an ultimate coin cell battery was formed as described below using the partially lithiated graphitic carbon electrode as the negative electrode.

Alternatively, direct addition of lithium metal comprised adding elemental lithium powder to the negative electrode prior to coin cell battery formation. In a first approach, a desired amount of stabilized lithium metal powder SLMP® (FMC Corp.) (stabilized lithium metal powder) was loaded into a vial and the vial was then capped with a mesh comprising nylon or stainless steel with a mesh size between about 40 µm to about 80 µm. SLMP® (FMC corp.) was then deposited onto the negative electrode by shaking or tapping the loaded vial over the negative electrode. In other embodiments, a slurry was formed by suspending a fine powder of SLMP® in p-xylene. The slurry was then applied to the formed negative electrode, and the coated negative electrode was dried. For either approach of adding the lithium powder to the negative electrode, the coated negative electrode was then compressed to ensure mechanical stability.

The amount of added lithium ("supplemental lithium") was expressed relative to the intercalation capacity of the negative electrode. In particular, assuming a lithium intercalation reaction at the negative electrode described by $Li+C_6 \rightarrow LiC_6$, the percent excess lithium was expressed by the formula $$\% \ Lithiation = \frac{wt_{Li}}{\left(\frac{M_{LiC_6}}{M_{C_6}}\right) \times wt_{active} - wt_{active}} \times 100$$

where $wt_{Li}$ is the weight of lithium applied to the negative electrode, $M_{LiC_6}$ is the molecular weight of $LiC_6$, $M_{C_6}$ is the molecular weight of $C_6$, and $wt_{active}$ is the weight of the active negative electrode material in the negative electrode.

Generally, the negative electrode was formed to give a load balancing of about 107% relative to the positive electrode, unless otherwise noted. The load balancing was determined by the ratio of the theoretical capacity per area of the negative electrode to the theoretical capacity per area of the positive electrode which can be written as $$\frac{z \times \left[ a \left(1 - \frac{\% \text{ Lithiation}}{100}\right) \times b \right]}{y \times (c \times d)}$$

where a and b are the weight and theoretical specific capacity of the active negative electrode material, respectively, y is the area of the negative electrode, c and d are the weight and theoretical specific capacity of the active positive electrode material, respectively, and z is the area of the positive electrode. The theoretical capacity of the positive electrode active material is calculated based on full extraction of all of the initial lithium.

To form a coin cell battery, the positive electrode and negative electrode were placed inside an argon filled glove box. An electrolyte was selected to be stable at high voltages, and appropriate electrolytes are described in the '992 application. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The coin cell batteries were tested with a Maccor cycle tester and the results are described in the following examples. Additionally, unless otherwise noted, performance data was obtained at room temperature. Additionally, unless otherwise noted, the batteries were charged and discharged between 4.5V and 2V at a rate of C/10 over the first cycle and at a rate of C/3 for subsequent cycles.

Example 4

Battery Performance: Long Cycling with Lithiation Using Elemental Lithium

This example demonstrates the long cycling performance of coin cell batteries formed with excess lithium added to the negative electrode electrochemically.

To demonstrate long term cycling performance, coin cell batteries were fabricated and cycled. The coin cell batteries were fabricated as described in Example 3 and varied in positive electrode composition, excess lithium, and load balancing as indicated below. In particular, batteries used in this example comprised positive electrodes formed from nanocoated LMO wherein X=0.5 or X=0.3.

Cycling and Capacity

Figure 8:
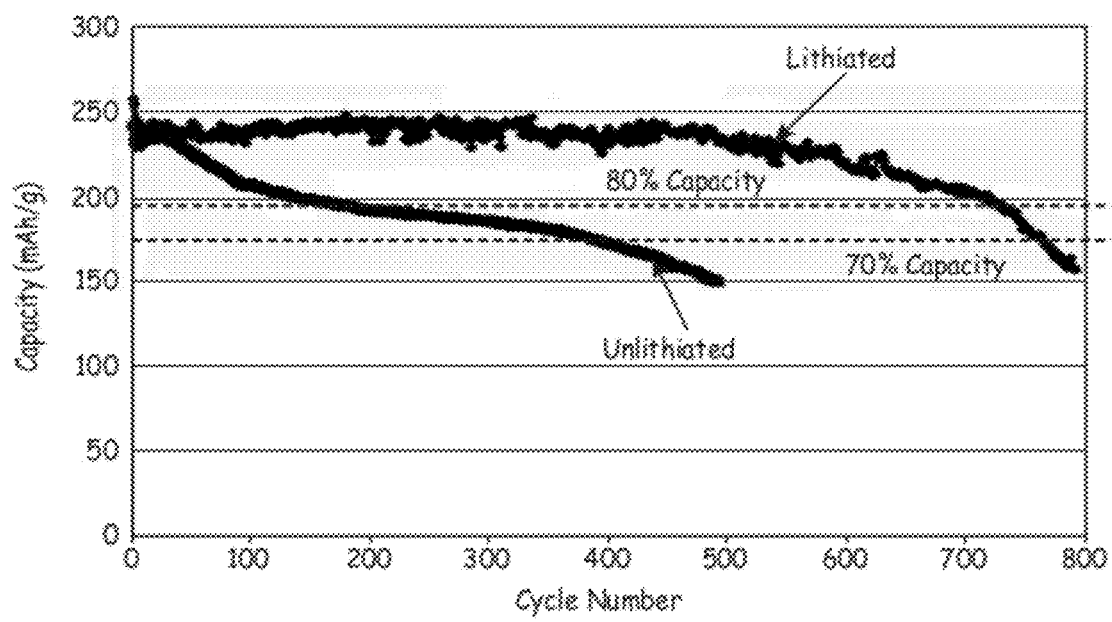
FIG. 8 is a graph comparing plots of specific discharge capacity versus cycle number for batteries with and without supplemental lithium and formed from positive electrode active materials wherein X=0.5.
Figure 9:
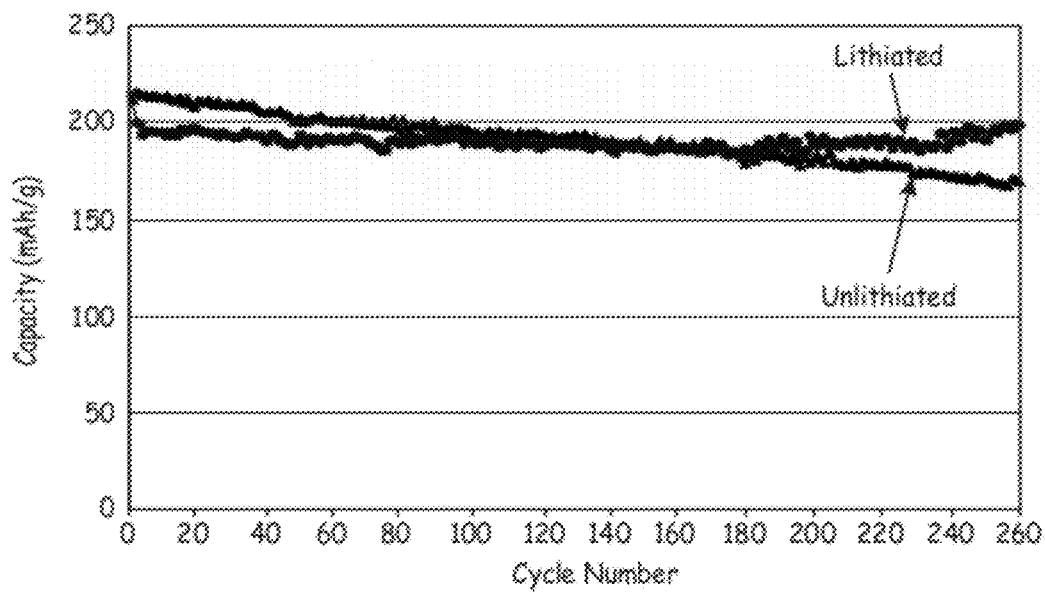
FIG. 9 is a graph comparing plots of specific discharge capacity versus cycle number for batteries with and without supplemental lithium formed from positive electrode active materials wherein X=0.3.

Batteries with supplemental lithium were seen to have improved cycling performance at moderate discharge rates over varied positive electrode compositions. FIGS. 8 and 9 are plots comparing cycling performance between 4.5V and 2V of batteries with or without supplemental lithium at a charge/discharge rate of C/3 for cathode active materials with X=0.5 (FIG. 8) and X=0.3 (FIG. 9). The first cycle charge and discharge rates were C/10. In both FIGS. 8 and 9, negative electrodes with supplemental lithium were formed with 30% supplemental lithium. With respect to FIG. 8, the battery with supplemental lithium experienced a specific capacity loss of 20% over about 720 cycles while the same capacity loss was observed in the battery without supplemental lithium over about 180 cycles. Similarly, with respect to FIG. 9, over 260 cycles, the battery with supplemental lithium experienced a capacity loss of less than 1% while the battery without supplemental lithium experienced a capacity loss of 19% of the same number of cycles.

Figure 10:
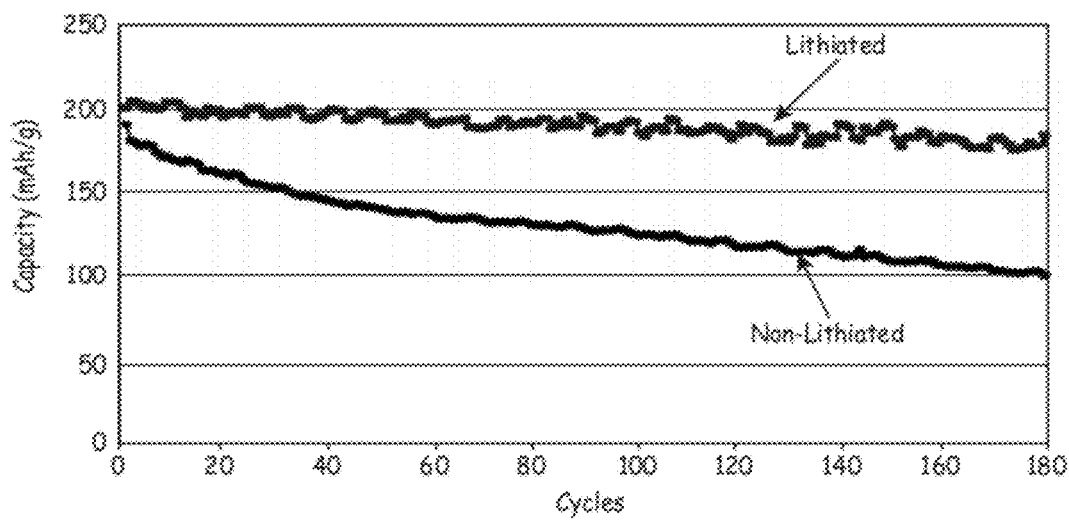
FIG. 10 is a graph comparing plots of specific discharge capacity versus cycle number for batteries with and without supplemental lithium cycled with a charge/discharge rate of 1 C.
Figure 11:
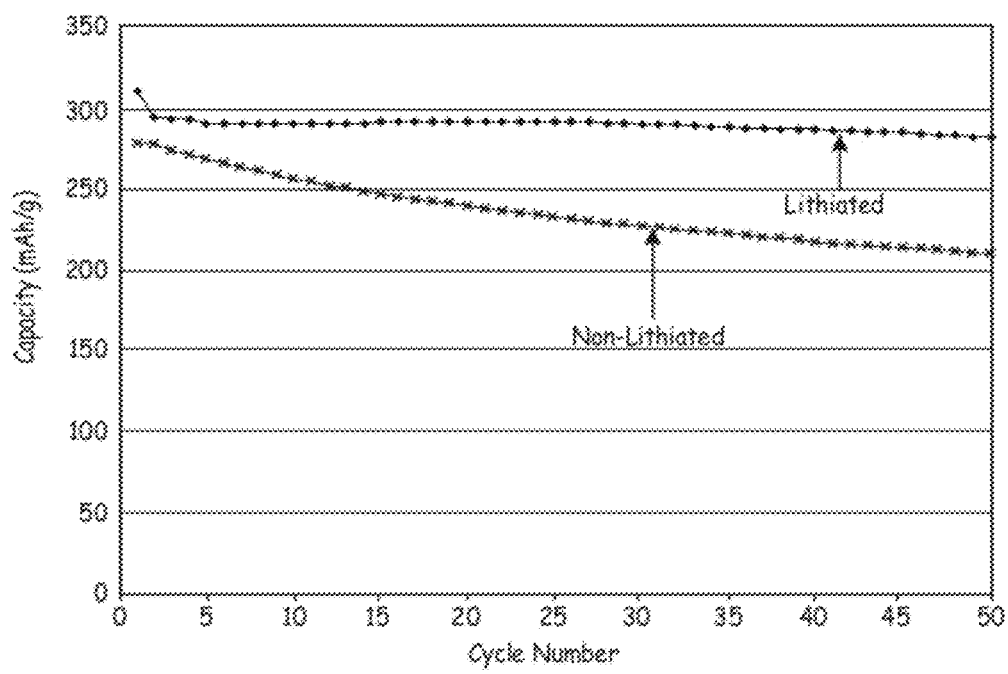
FIG. 11 is a graph comparing plots of specific discharge capacity versus cycle number for batteries with and without supplemental lithium cycled at a temperature of 55° C.

Batteries with supplemental lithium also had improved cycling performance at higher discharge rates and at higher temperatures. For the evaluation of batteries at rates of 1 C, batteries were formed with 30% supplemental lithium. FIG. 10 is a plot comparing cycling performance of battery with or without supplemental lithium at a cycling discharge rate of 1 C. Over 180 cycles, the battery without supplemental lithium showed significantly increased capacity fade relative to the battery with the supplemental lithium. Equivalent batteries were formed to evaluate the performance at higher temperatures. FIG. 11 is a plot comparing the cycling performance of batteries with or without supplemental lithium cycled at a temperature of 55° C. Over 50 cycles, the battery without supplemental lithium showed significantly increased capacity fade relative to the battery with supplemental lithium.

Capacity and Voltage

Figure 12:
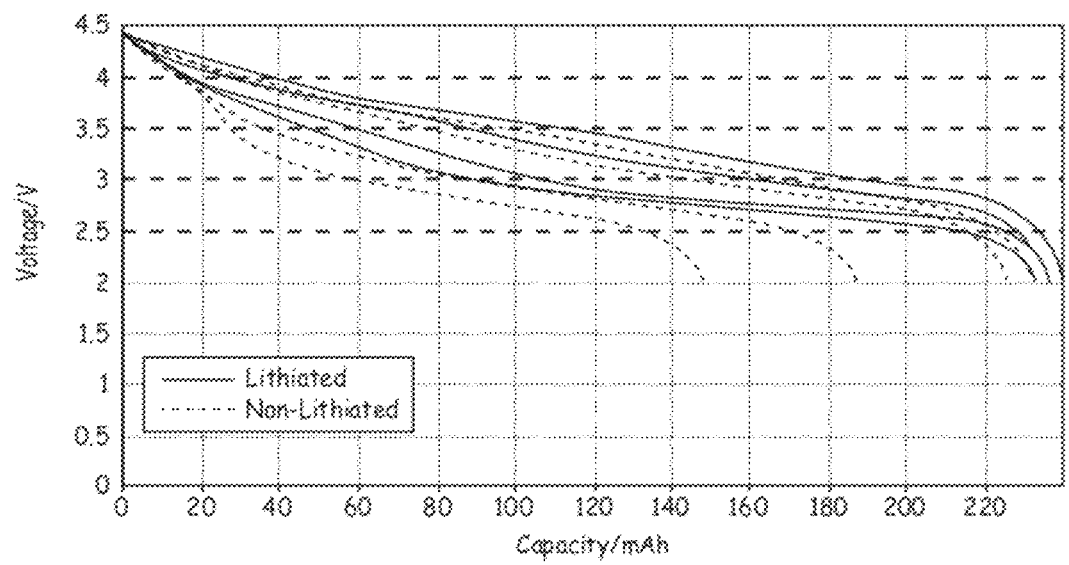
FIG. 12 is a graph comparing plots of discharge voltage versus accumulated discharge capacity for batteries with and without supplemental lithium at various cycle numbers.

While batteries with supplemental lithium maintained their capacity extremely well over relatively high numbers of cycles. FIG. 12 is a plot of discharge curves with voltage as a function of capacity for batteries with or without supplemental lithium at four selected cycles. The negative electrode of the battery with supplemental lithium was formed with 30% supplemental lithium. Discharge curves were obtained for both batteries during cycle number 10, 50, 300, and 500. Table 3 below includes the accumulated discharge capacities obtained over various voltage ranges for the discharge curves shown in FIG. 12. Generally, for both of the batteries with or without supplemental lithium, the discharge capacity decreased monotonically over a voltage range of 4.0V-3.5V with cycling. On the other hand, the discharge capacity for both the batteries with or without supplemental lithium increased monotonically over a voltage range of 3.0V-2.5V with cycling. A slower decay with cycling of the capacity with a small plateau or small increase at lower cycling is observed in the voltage range of 3.5V-3.0V. From the discharge curves in FIG. 12, it is observed that the battery without supplemental lithium undergoes a significant drop in capacity with cycling over 500 cycles while the battery with the supplemental lithium undergoes a very small drop in capacity.

TABLE 3

| Cycles | Negative Electrode | Capacity 4.0 V-3.5 V (mAh) | Capacity 3.5 V-3.0 V (mAh) | Capacity 3.0 V-2.5 V (mAh) |
|---|---|---|---|---|
| 10 | Lithiated | 85 | 70 | 40 |
|  | Non-Lithiated | 65 | 70 | 50 |
| 100 | Lithiated | 60 | 80 | 60 |
|  | Non-Lithiated | 45 | 70 | 45 |
| 300 | Lithiated | 40 | 50 | 120 |
|  | Non-Lithiated | 22 | 45 | 85 |
| 500 | Lithiated | 35 | 45 | 130 |
|  | Non-Lithiated | 12 | 40 | 70 |

Example 5

Battery Performance: Effect of Amount of Supplemental Lithium by Direct Addition of Lithium Metal and Effect of Balancing of Negative Electrode and Positive Electrode During Long Cycling This example demonstrates the effect of load balancing and amount of supplemental lithium introduced by direct addition of lithium metal powder on the long cycling performance of coin cell batteries.

To demonstrate performance with a large number of cycles, coin cell batteries were fabricated and cycled. The coin cell batteries were as described in Example 3 and were fabricated from positive electrodes comprising nanocoated LMO with X=0.5. The batteries varied in load balancing and supplemental lithium. In particular, batteries were load balanced at 107% or 120%. Additionally, batteries were formed with and without supplemental lithium added as an SLMP® lithium powder (FMC Corp.). Batteries formed with supplemental lithium comprised 5%, 30%, or 50% supplemental lithium.

Figure 13:
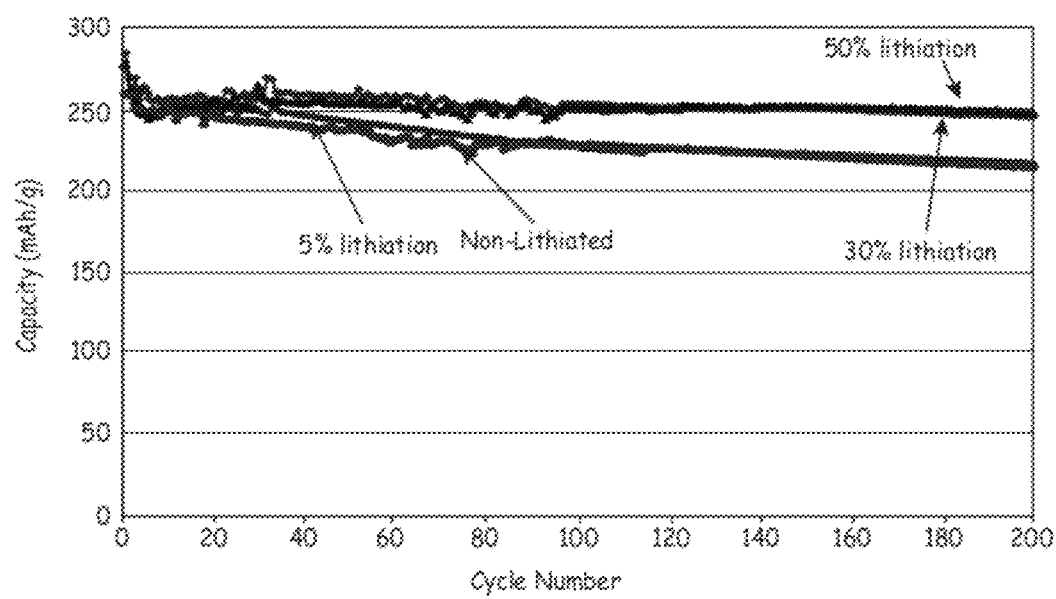
FIG. 13 is a graph comparing plots of specific discharge capacity versus cycle number for batteries balanced at 107% anode and comprising various amounts of supplemental lithium.
Figure 14:
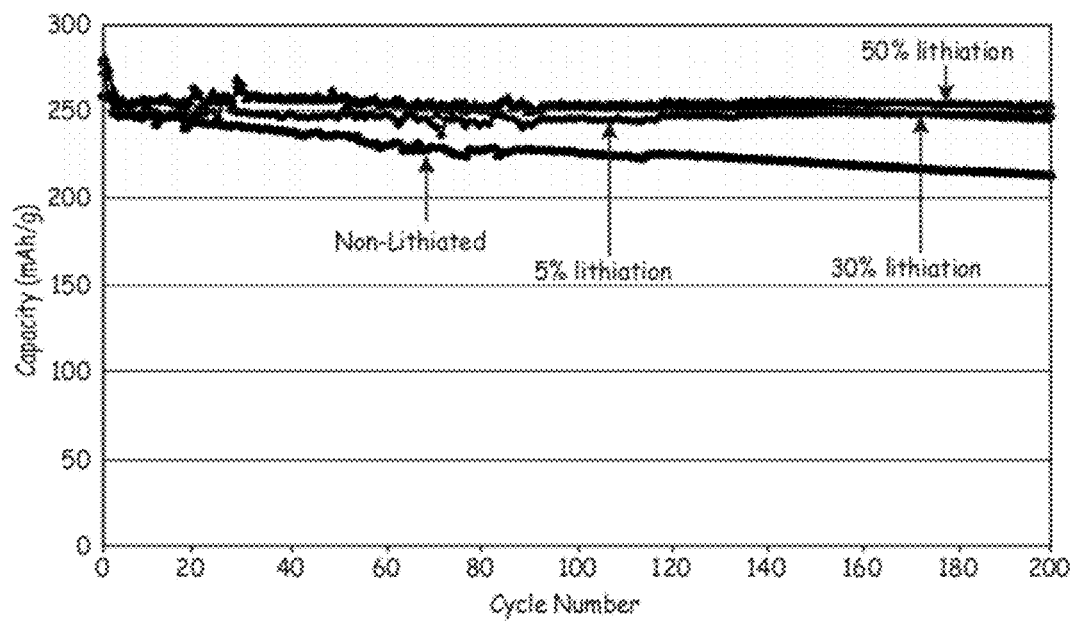
FIG. 14 is a graph comparing plots of specific discharge capacity versus cycle number for batteries balanced at 120% anode and comprising various amounts of supplemental lithium.

Generally, at both 107% and 120% load balancing, batteries with supplemental lithium had improved cycling performance. FIGS. 13 and 14 are plots comparing the cycling performance of batteries balanced at 107% and 120%, respectively, for batteries with and without supplemental lithium. With respect to FIG. 13, the battery with 5% supplemental lithium had comparable cycling performance to the battery without supplemental lithium. On the other hand, the batteries with 30% and 50% supplemental lithium significantly outperformed the battery without supplemental lithium with a low amount of capacity fade out to 200 cycles.

With respect to FIG. 14, specific discharge capacity as a function of cycling is shown for batteries with supplemental lithium and a balance of 120% anode capacity. With this negative electrode balance, the batteries comprising 5%, 30%, and 50% supplemental lithium had significantly improved cycling performance relative to the battery without supplemental lithium. The plot for the battery without supplemental lithium is obtained with a balance of 107% anode capacity, but the results with 120% anode capacity and no supplemental lithium are expected to be similar. For higher amounts of lithiation, the anode balance did not significant alter the cycling performance.

Example 6

Batter Performance: Effect of Amount of Supplemental Lithium by Electrochemical Addition of Lithium and Effect of Balancing of Negative Electrode and Positive Electrode During Long Cycling This example demonstrates the long term cycling performance of coin cell batteries formed with supplemental lithium introduced by electrochemical lithiation. The batteries used in this example were formed as described in Example 3. In particular, batteries comprised positive electrodes fabricated from nanocoated LMO wherein x=0.5. Batteries were formed with and without supplemental lithium added electrochemically.

Figure 15:
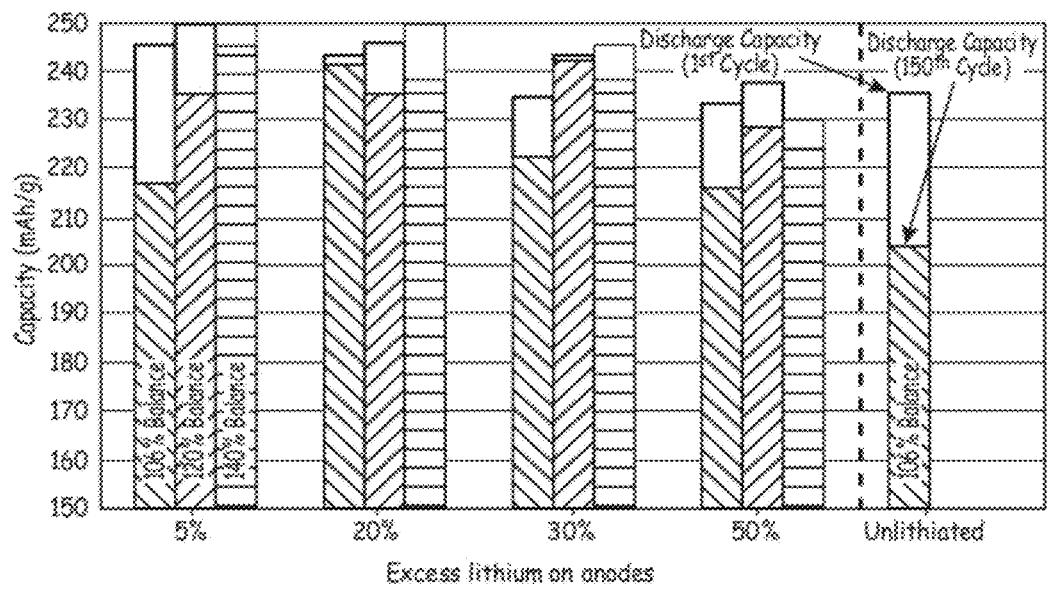
FIG. 15 is a graph comparing histograms of specific discharge capacity versus amount of supplemental lithium for batteries balanced at 106%, 120% and 140% anode.

Generally, batteries with initially electrochemically lithiated negative electrodes showed superior long term cycling performance relative to batteries with no supplemental lithium. Batteries were formed with either 5%, 15%, 30%, or 50% supplemental lithium added to the negative electrode electrochemically. Batteries were selectively balanced with a relative negative electrode capacity at 106%, 120%, or 140%, and the batteries were cycled 150 times. FIG. 15 is a histogram of specific capacities for the various batteries obtained at the 4th and 150th discharge cycles when cycled from 4.5V to 2 V. The results at the 150th cycle are plotted with a dark shading while the result at the 1st cycle are plotted in a light shading superimposed over the 150 cycle results. It was generally seen that the inclusion of supplemental lithium increased initial battery capacity, although some of the larger loadings of supplemental lithium resulted in a relatively small decrease in initial capacity. However, the batteries with supplemental lithium exhibit decreased capacity fade relative to the battery without the supplemental lithium.

Example 7

Effect of Supplemental Lithium on Positive and Negative Electrodes

This example demonstrates the effects of supplemental lithium on the positive and negative electrodes of coin cell batteries upon cycling.

Figure 16:
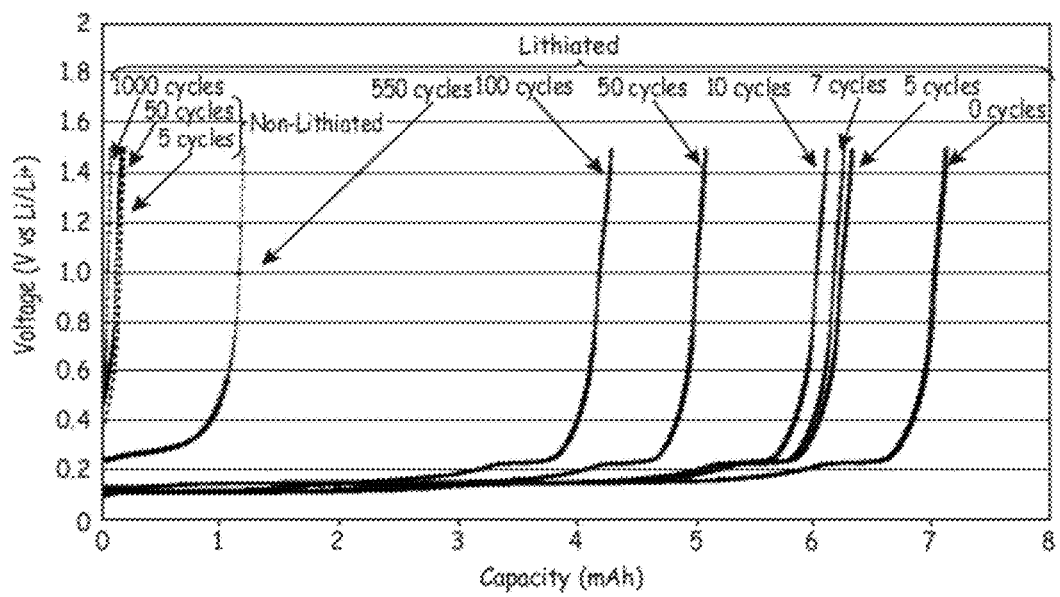
FIG. 16 is a graph comparing plots of charging voltage versus charging capacity for test coin-cells formed from positive electrodes obtained from cycled batteries with and without supplemental lithium.

Batteries used in this Example were formed as described in Example 3 and comprised positive electrodes formed from nanocoated LMO where X=0.5. Batteries were formed either without supplemental lithium or with 5% supplemental lithium supplied as SLMP® lithium powder supplied on the surface of the negative electrode. The negative electrode was balanced at 107%. The batteries were charged and discharged over the first cycle at a rate of C/10, over the second and third cycles at a rate of C/5, and over subsequent cycles at a rate of C/3. Unless otherwise noted, the battery compositions and cycling parameters just described were used to obtain the data below in this example.
Negative Electrode Stability The effect of supplemental lithium on the negative electrode was initially characterized by determining the amount of excess lithium present in a battery after cycling. In particular, it was seen that even at large cycle numbers, excess lithium was still present in discharged batteries and that batteries with supplemental lithium had significantly greater amounts of excess lithium relative to batteries without supplemental lithium. Ten coin cell batteries were formed: 7 batteries with supplemental lithium and 3 batteries without supplemental lithium. Each battery was cycled a predetermined number of times ranging from 0-1000. After cycling, each battery was discharged to 2 V, and the negative electrode was removed. Coin cell batteries were subsequently formed by assembling the removed negative electrode from each battery and placed across a separator from a lithium foil electrode. Each testing coin cell was then charged a single time to extract lithium from the graphitic carbon electrode. FIG. 16 is a plot of voltage vs. capacity for test coin-cells charged to 1.5 V during lithium extraction. The results reveal a substantially greater amount of lithium in the negative electrodes recovered from cycled batteries with supplemental lithium relative to the negative electrodes recovered from the cycled batteries without supplemental. In particular, the recovered negative electrode with supplemental lithium that was cycled 550 times had a significantly greater amount of lithium relative to the recovered negative electrode without supplemental lithium that was cycled only 5 times. At 1000 cycles, the battery with supplemental lithium was essentially depleted of supplemental lithium since the negative electrode exhibited a low remaining capacity.

Figure 17:
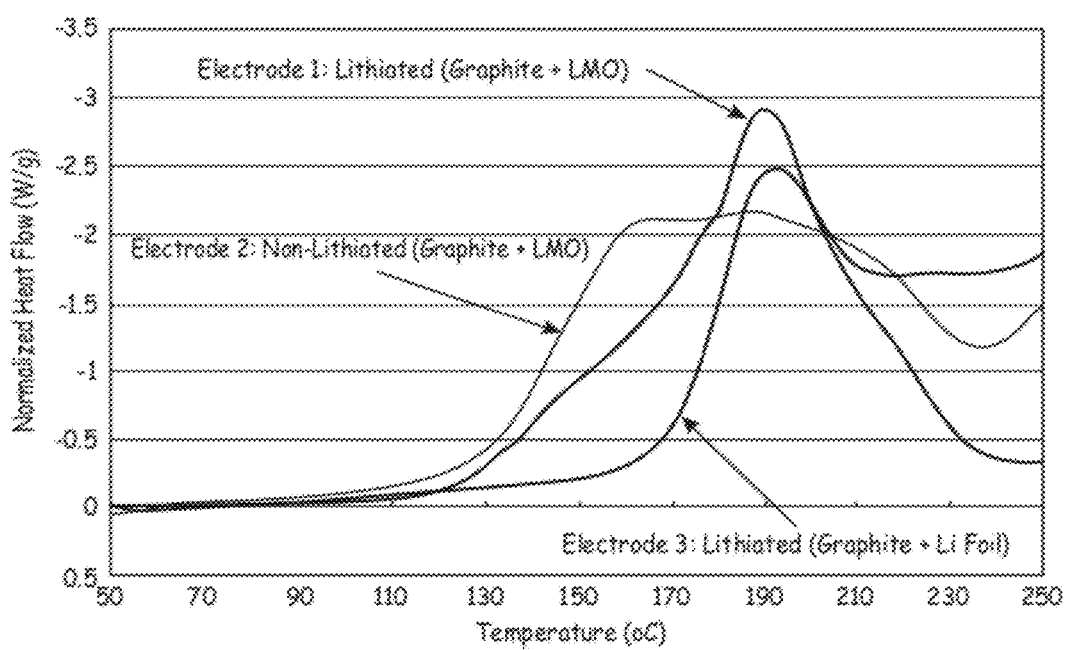
FIG. 17 is a graph comparing normalized heat flow versus temperature for lithiated and non-lithiated graphitic electrodes obtained by differential scanning calorimetry.

Furthermore, the inclusion of supplemental lithium was seen to increase the stability of the solid electrolyte interface (SEI) layer formed on a graphitic electrode. Three negative electrodes were prepared. A first negative electrode was prepared as described in Example 3 by initially forming a battery with 30% supplemental lithium added electrochemically and a positive electrode comprising nanocoated LMO with x=0.5. The battery with supplemental lithium was cycled 30 times, and the negative electrode was charged to 4.5V and removed. A second negative electrode was prepared by initially forming a battery without supplemental lithium as described in Example 3 wherein the positive electrode comprised nanocoated LMO with X=0.5. The battery without supplemental lithium was charged to 4.5V, and the negative electrode was removed. A third negative electrode was prepared by initially forming a lithiation cell as described in Example 3 comprising a graphitic electrode, a lithium foil electrode, and a separator disposed between the electrodes. The lithiation cell was then cycled three times and then discharged to 5 mV to electrochemically lithiate the graphitic electrode. The lithiated negative electrode was subsequently removed from the lithiation cell. FIG. 17 is a plot showing the results of differential scanning calorimetry ("DSC") analysis performed on the three negative electrodes. Relative to the second negative electrode, the first negative electrode showed greater stability at higher temperatures. The second negative electrode exhibited an increase in heat flow relative to the heating of the material at a temperature between about 90 and 100° C. while the first negative electrode exhibited an increase in heat flow between 120 and 130° C. Additionally, relative to both the second and third electrodes, the first electrode showed significantly more stability with an increase in heat flow not observed until about 150° C., which suggests a more stable SEI layer until relatively high temperatures.

Positive Electrode Stability

Figure 18:
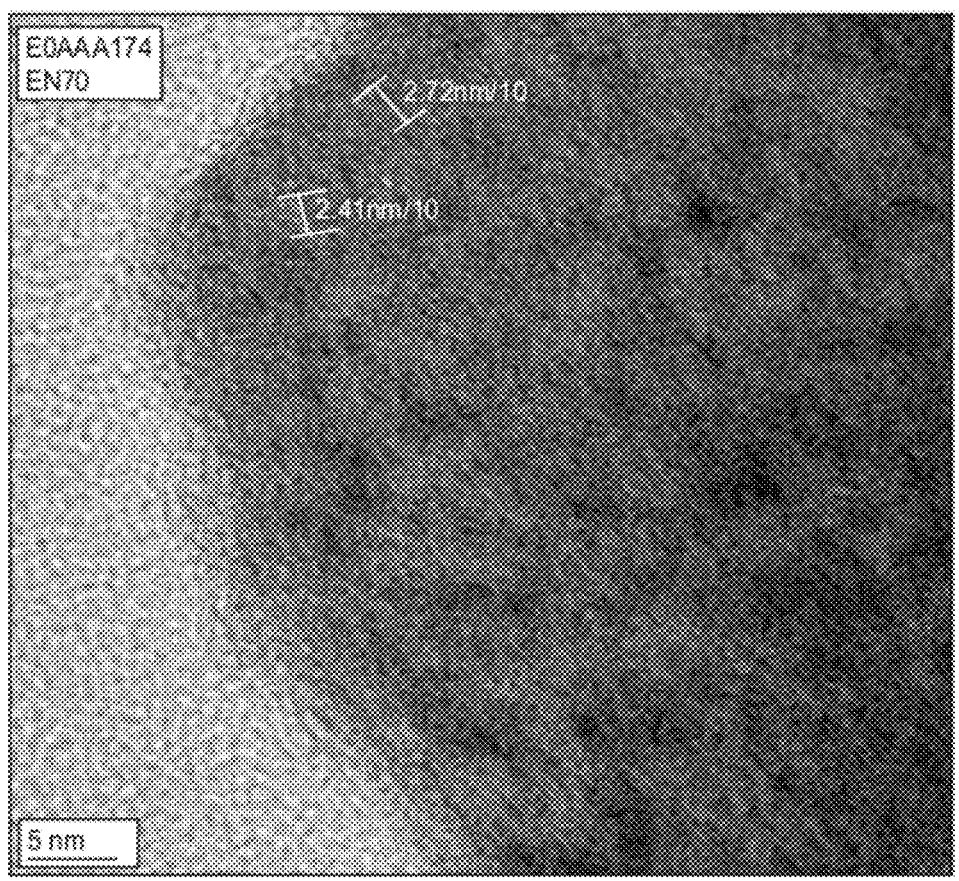
FIG. 18 is a high resolution transmission electron microscopy image of a positive electrode taken after long cycling from a battery without supplemental lithium.
Figure 19:
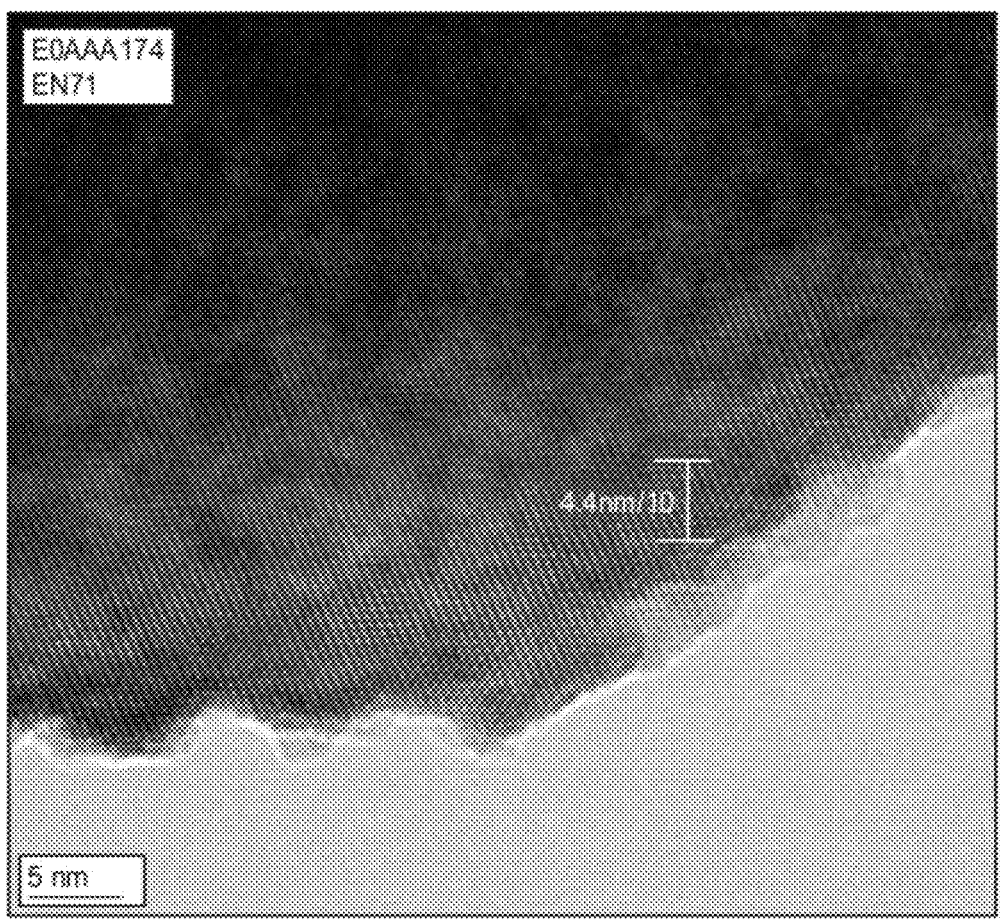
FIG. 19 is a high resolution transmission electron microscopy image of a positive electrode taken after long cycling form a battery with supplemental lithium.
Figure 20:
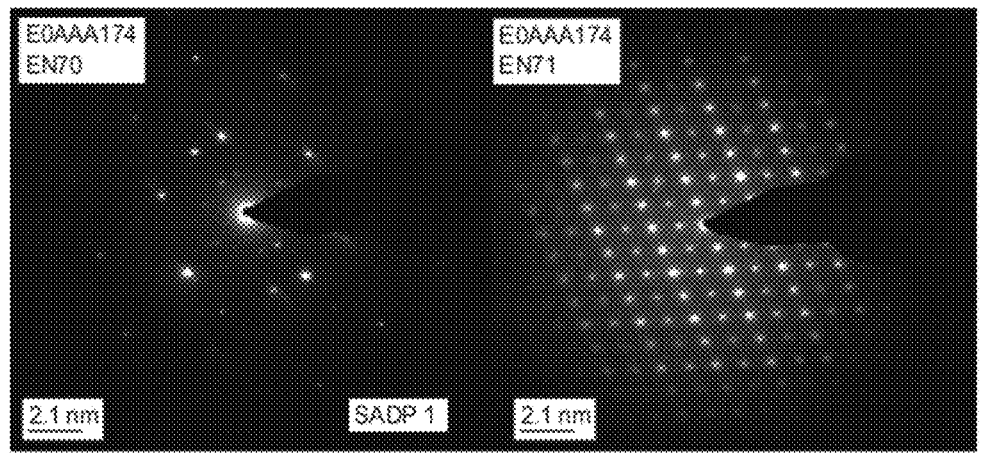
FIG. 20 is a composite of electron diffraction patterns obtained from electron diffraction spectroscopy measurements of positive electrodes taken, after cycling, from batteries with (right panel) and without (left panel) supplemental lithium.

The effect of supplemental lithium on the positive electrode was characterized in part by analyzing its effect on the structure of the positive electrode. The formation step for the battery without supplemental lithium comprised a two-step formation process consisting of an initial charge to 4.2V, resting the battery in an open circuit for 7 days, and then charging the battery to 4.6V. A two step formation process is described further in copending U.S. patent application Ser. No. 12/732,520, now published application no. 20110236751 to Amiruddin et al., entitled "High Voltage Battery Formation Protocols and Control of Charging and Discharging for Desirable Long Term Cycling Performance," incorporated herein by reference. The battery with supplemental lithium was charged and discharged in the first cycle at a rate of C/10. Both batteries were cycled 550 times at a charge and discharge rate of C/3 between 4.5V and 2V and subsequently dismantled. The positive electrode of each battery was analyzed using high resolution transmission electron microscopy ("TEM"). FIGS. 18 and 19 are TEM images of the positive electrode material obtained from the cycled coin cell batteries without supplemental lithium (FIG. 18) and with supplemental lithium (FIG. 19). FIG. 18 reveals that after cycling, the positive electrode obtained from the battery without supplemental underwent structural changes to a disordered structure and with some evidence of porosity consistent with dissolution of material from the particles. On the other hand, the positive electrode obtained from the battery with supplemental lithium reveals a highly ordered structure after cycling, as indicated in FIG. 19, which is consistent with little if any dissolution of material from the particle. These results are consistent with electron diffraction results shown in FIG. 20, which is a composite of diffraction patterns obtained from electron diffraction spectroscopy measurements after cycling of the positive electrode materials without supplemental lithium (left panel) and with supplemental lithium (right panel). The x-ray diffraction pattern for the materials with supplemental lithium show a very ordered pattern consistent with a highly crystalline structure, while the x-ray diffraction pattern of the material without supplemental lithium exhibits a pattern consistent with low structural order.

Compositional analysis reveals that structural changes in the positive electrode during cycling are accompanied by changes in chemical composition. After cycling the batteries with and without supplemental lithium for 550 cycles, the chemical composition of the positive electrodes and the negative electrodes was analyzed. Specifically, samples were taken from the positive electrodes and analyzed using energy dispersive x-rays ("EDS"). EDS results for the positive electrodes are shown in Table 4.

TABLE 4

| Element | From Battery W/O Supplemental Lithium | | From Battery W/ Supplemental Lithium | |
| --- | --- | --- | --- | --- |
| | Weight % | Atomic % | Weight % | Atomic % |
| Mn | 33.8 | 18.49 | 43.12 | 22.62 |
| Co | 9.48 | 5.29 | 8.1 | 3.96 |
| Ni | 14.75 | 9.86 | 11.03 | 5.41 |
| O | 41.97 | 63.92 | 37.75 | 68.01 |

EDS analysis show that dissolution of Mn from the positive electrode is reduced in the battery with supplemental lithium. Results of glow-discharge mass spectrometry ("GDMS") analysis of the negative electrodes recovered from the batteries with and without supplemental lithium are shown in Table 5.

TABLE 5

| Element | From Battery W/O Supplemental Lithium | From Battery W/ Supplemental Lithium |
| --- | --- | --- |
| Mn | 8.6 wt % | 0.12 wt % |
| Co | 2 wt % | 85 (ppm) |
| Ni | 2.7 wt % | 360 (ppm) |

GDMS analysis shows a much lesser concentration of Mn, Co, and Ni in the negative electrode obtained from the battery with the supplemental lithium. For the batteries without supplemental lithium, large amounts of manganese is found in the negative electrode and less but still substantial amounts of cobalt and nickel are also found in the negative electrode.

Figure 21:
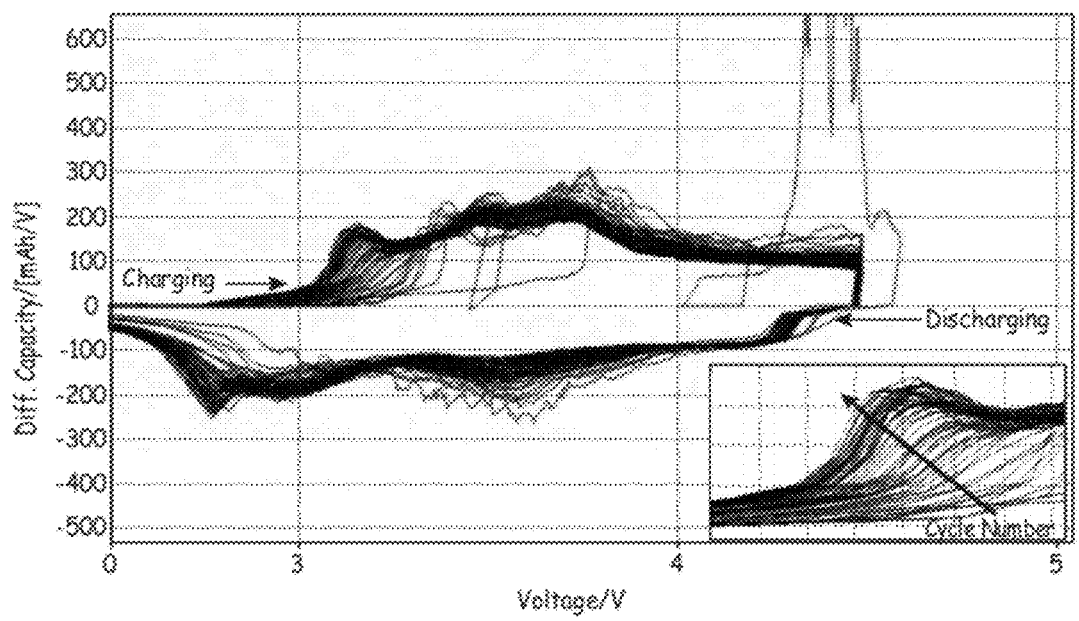
FIG. 21 is a graph comparing plots of differential capacity versus voltage at various cycle numbers for a battery without supplemental lithium.
Figure 22:
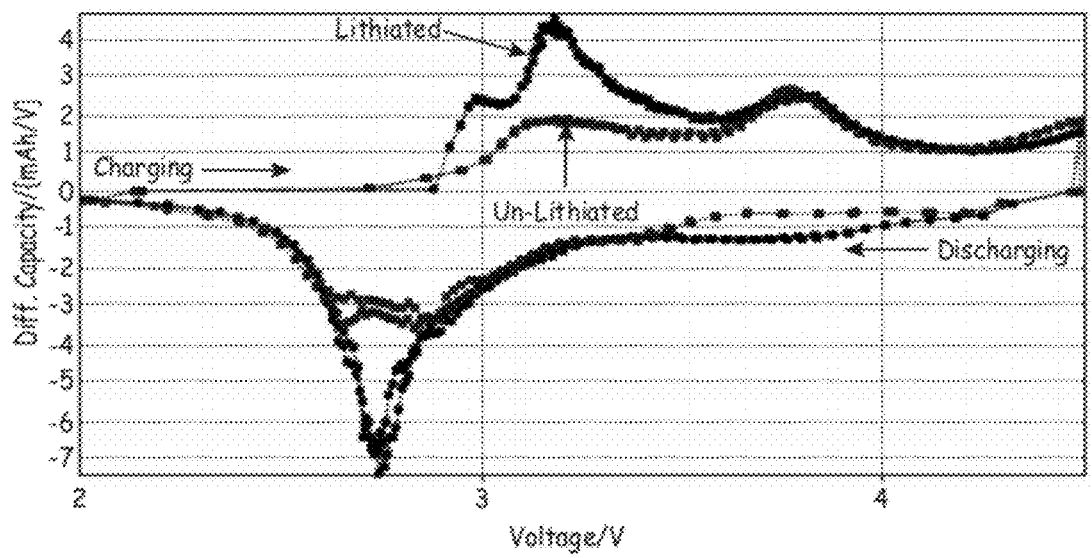
FIG. 22 is a graph comparing plots of differential capacity versus voltage at various cycle numbers for batteries with and without supplemental lithium.

Analysis of differential capacity measurements during battery cycling was used to determine the effect of the above mentioned compositional changes on battery performance. Batteries with supplemental lithium and without supplemental lithium were cycled 400 times. FIG. 21 is a plot showing differential capacity for charging (positive values) and discharging (negative values) for the battery without supplemental lithium over the first 300 cycles. The inset of FIG. 21 is an enlargement of the peak present at about 3.05V-3.25V seen in the differential capacity during charging. It was seen that 2.5V-3V discharge activity increased over the first 300 cycles while 3.25V-4V discharge activity decreased over the same number of cycles. FIG. 22 is a plot showing differential capacity plots for both batteries generated at the $300^{th}$ and $400^{th}$ cycles. During discharge, the battery with supplemental lithium was seen to have increased 2.5V-3V activity relative to the battery without supplemental lithium. Additionally, the battery with supplemental lithium was seen to have increased 3.25-4V activity relative to the battery without supplemental lithium during discharge. Furthermore, FIG. 22 shows that with respect to 2.5V-3V activity during discharge, the battery comprising supplemental lithium had a smaller difference in the differential discharge capacity between the 300th and 400th cycles, relative to the battery without supplemental lithium. These results suggested that supplemental lithium further stabilizes the positive electrode of corresponding batteries.

Figure 23:
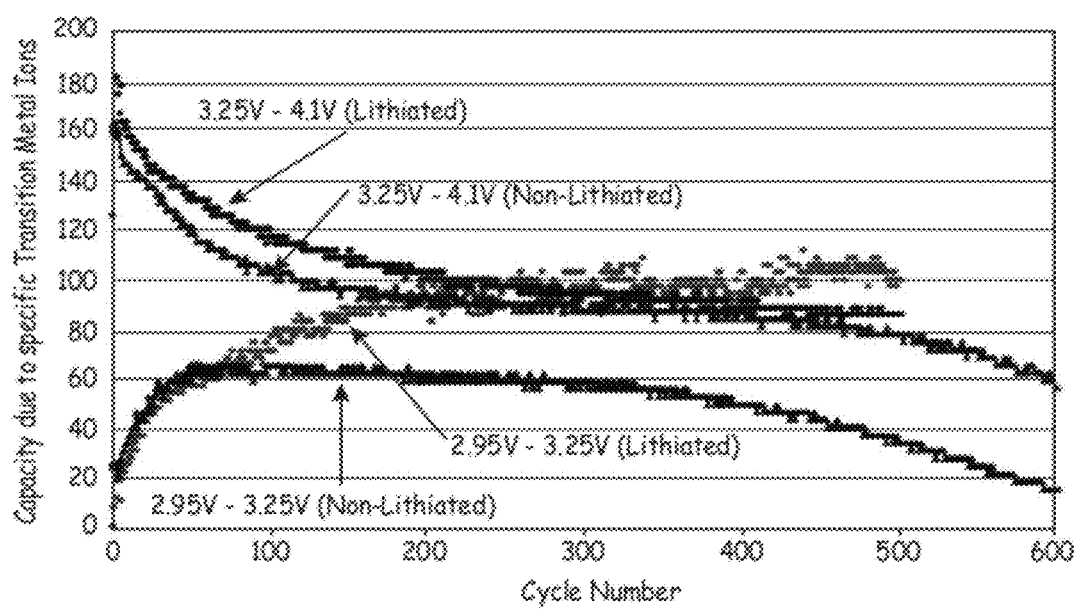
FIG. 23 is a graph comparing plots of ionic contributions to the specific capacity versus voltage at various cycle numbers for batteries with and without supplemental lithium.

Furthermore, the improved cycling performance of lithiated batteries demonstrated in Example 4 above can be at least partially explained by the stabilization of the positive electrode due to the presence of excess lithium. Batteries with and without supplemental lithium were cycled 500 and 600 times, respectively. FIG. 23 is a plot showing the effect of ionic activity in the positive electrode on discharge capacity.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A method for loading a negative electrode with supplemental lithium to form a preloaded negative electrode for a lithium ion battery wherein the positive electrode comprises a lithium metal oxide composition and the negative electrode comprises an active lithium intercalation/alloying composition (the active composition) having a total theoretical capacity and a polymer binder, the method comprising:

electrochemically intercalating/alloying lithium from a lithium source material as supplemental lithium into the active composition in an electrode structure further comprising a polymer binder to form preloaded extractable lithium in the active composition wherein the supplemental lithium is from about 15% to about 45% of the negative electrode capacity;

assembling the preloaded negative electrode with the positive electrode comprising the lithium metal oxide wherein the lithium metal oxide is approximately represented by a formula $Li_{1+x}M_{1-y}O_{2-z}F_z$ where M is one or more metal elements, x is from about 0.01 to about 0.33, y is from about x−0.2 to about x+0.2 with the proviso that y≥0, and z is from 0 to about 0.2 to form a battery and wherein the initial capacity of the negative electrode capacity prior to preloading with lithium is from 115% to 180% of the initial capacity of the positive electrode active material, wherein the preloaded extractable lithium in the preloaded negative electrode comprises above any amount of lithium consumed in association with the first cycle irreversible capacity loss of the negative electrode, from about 2 percent to about 55 percent of the total theoretical capacity of the active composition less the negative electrode irreversible capacity loss; and cycling the battery with a charge voltage of at least about 4.35V.

2. The method of claim 1 wherein the electrochemical intercalating/alloying step comprises intercalating/alloying lithium to a level of at least about 80 percent of total theoretical capacity of the active composition and further comprising a de-intercalating/de-alloying step comprising de-intercalating/de-alloying the preloaded extractable lithium to no more than about 25% of the total theoretical capacity of the active composition.

3. The method of claim 1 further comprising repeating at least once the electrochemically intercalating/alloying step, and for each repeated intercalating/alloying step, de-intercalating/de-alloying electrochemically at least partially preloaded extractable lithium.

4. The method of claim 1 wherein the preloaded extractable lithium takes up from about 5 percent to about 60 percent of the total theoretical capacity of the active composition.

5. The method of claim 1 wherein the electrochemically intercalating/alloying step comprises contacting the negative electrode and the lithium source material in an electrolyte and making an electrical connection between the negative electrode and the lithium source material.

6. The method of claim 1 wherein the lithium source material is lithium foil.

7. The method of claim 1 wherein the lithium source material is elemental lithium, lithium alloy, or a combination thereof.

8. The method of claim 1 wherein the active composition consists essentially of graphitic carbon.

9. The method of claim 1 wherein the active composition comprises silicon.

10. The method of claim 1 wherein after cycling the battery for 20 cycles from 4.5 volts to 2.0 volts and after fully discharging the battery to 2.0 volts, the negative electrode of the battery retains a specific capacity of at least about 1 mAh/g.

11. The method of claim 1 wherein after cycling the battery for 20 cycles from 4.5 volts to 2 volts and after discharging the battery to 98 percent of the battery capacity, the negative electrode of the battery retains a capacity of at least about 2.5% of the total theoretical capacity of the active composition.

12. The method of claim 1 further comprising cycling the battery multiple times with a charge voltage of at least about 4.4V.

* * * * *